(12) United States Patent
Ward et al.

(10) Patent No.: US 11,293,624 B2
(45) Date of Patent: Apr. 5, 2022

(54) LIGHT SOURCE

(71) Applicant: IN TANDEM DESIGNS PTY LTD, Warrnambool (AU)

(72) Inventors: Geoffrey Ward, Warrnambool (AU); Bradley Charles Jones, Endeavour Hills (AU)

(73) Assignee: IN TANDEM DESIGNS PTY LTD, Warrnambool (AU)

( * ) Notice: Subject to any disclaimer, the term of this patent is extended or adjusted under 35 U.S.C. 154(b) by 536 days.

(21) Appl. No.: 16/077,624

(22) PCT Filed: Feb. 10, 2017

(86) PCT No.: PCT/GB2017/050370
§ 371 (c)(1),
(2) Date: Aug. 13, 2018

(87) PCT Pub. No.: WO2017/137777
PCT Pub. Date: Aug. 17, 2017

(65) Prior Publication Data
US 2021/0010658 A1    Jan. 14, 2021

(30) Foreign Application Priority Data

Feb. 11, 2016    (GB) .................................... 1602502

(51) Int. Cl.
*G02B 7/00*    (2021.01)
*F21V 14/02*    (2006.01)
(Continued)

(52) U.S. Cl.
CPC .............. *F21V 14/02* (2013.01); *F21V 19/02* (2013.01); *F21V 29/503* (2015.01); *F21V 29/90* (2015.01);
(Continued)

(58) Field of Classification Search
CPC ........ F21V 14/02; G02B 7/004; G05G 23/00; H05B 47/165
See application file for complete search history.

(56) References Cited

U.S. PATENT DOCUMENTS 3,897,139 A  *  7/1975  Caruolo ............... G02B 7/1825
                                                        359/873
5,140,470 A  *  8/1992  Luecke .................. G02B 7/004
                                                        359/818
(Continued)

*Primary Examiner* — Zheng Song
(74) *Attorney, Agent, or Firm* — Browdy and Neimark, P.L.L.C.

(57) ABSTRACT

A positional adjustment mechanism comprises a movable plate having first and second positioning actuators and a biasing member to bias the plate against the actuators. The movable plate has three flat surfaces facing the actuators and biasing member one of which is not substantially perpendicular to either of the other two. The biasing member ensures that the plate is held in contact with the actuators during adjustment. Also, an adjustable mount comprises a support and a fixed bar extending therefrom, an axially movable bar extending from the support and being axially movable relative thereto, and an element movably mounted to the fixed bar and movably mounted to the movable bar, the first element being selectively fixable relative to the fixed bar and selectively fixable relative to the movable bar. This arrangement allows a great degree of freedom in adjusting the position of the element as it can be selectively fixed to either or both of the fixed bar and movable bar.

22 Claims, 14 Drawing Sheets

(51) Int. Cl.
*F21V 29/503* (2015.01)
*F21V 29/90* (2015.01)
*H05B 47/165* (2020.01)
*F21V 19/02* (2006.01)
*G05G 23/00* (2006.01)

(52) U.S. Cl.
CPC ........... *G02B 7/004* (2013.01); *H05B 47/165* (2020.01); *G05G 23/00* (2013.01)

(56) References Cited

U.S. PATENT DOCUMENTS

| | | | | |
|---|---|---|---|---|
| 5,282,393 A | * | 2/1994 | Arnone | G02B 6/4226 |
| | | | | 269/60 |
| 5,757,561 A | * | 5/1998 | Sechrist | C08J 5/18 |
| | | | | 359/818 |
| 2005/0279949 A1 | * | 12/2005 | Oldham | G05D 23/20 |
| | | | | 250/458.1 |

* cited by examiner

LIGHT SOURCE

The invention relates to light sources and positioning mechanisms, in particular an in-plane adjustment mechanism and an axial adjustment mechanism. More particularly, the invention relates to optical apparatus including one or more of such adjustment mechanisms.

Numerous mechanisms have been designed for adjusting the position of an element in a plane, i.e. allowing adjustments in two dimensions. Such mechanisms typically involve a first actuator that is capable of providing movement predominantly in one direction and a second actuator that is capable of providing movement predominantly in a perpendicular direction. A typical arrangement is to use stacked linear stages such as two screw-driven stages orthogonal to one another, with the first screw stage being used to adjust the position of the second screw stage (first dimension) and the second screw stage being used to adjust the position of the element (second dimension). In this way the element can be deployed to a range of positions defined by the ranges of the first and second screw stages.

There are disadvantages of stacking linear stages to obtain 2 dimensional movement. One disadvantage is that each stage increases the thickness. Another disadvantage is that the position of the adjusting mechanism of the secondary stage moves with respect to the primary stage.

These problems have been addressed for example by U.S. Pat. No. 5,281,884 which uses four screws to push the stage either side of a centre spring loaded position; U.S. Pat. No. 4,610,442 which uses three screws and three springs to provide X-Y and rotational positioning; U.S. Pat. No. 4,993,673 which uses a system of four wedges, two of which are spring loaded and two of which are positioned by screws to achieve X-Y positioning.

U.S. Pat. No. 5,341,700 also provides a solution to the problem but with a complex arrangement of slots and guides. U.S. Pat. No. 6,115,166A uses two screws that each push against a respective opposed spring.

It is an object of at least certain preferred embodiments of the invention to provide a simple, cost effective, X-Y positioning system in a single stage with a low height in the Z direction and with low movement in the Z direction.

There are also problems associated with linear movement (i.e. single axis movement) in fields which require precise alignment. For example in the field of optics, the relative positioning of light sources, lenses, prisms, gratings, etc. can be of great importance. Such relative positioning is also important in other industries such as in machining tools which require very precise alignment of a tool and a workpiece. Therefore in other aspects, the invention relates to movement of parts in a linear manner, more specifically moving of parts on a linear slipway such as a dovetail slipway. It is an object of at least certain preferred embodiments of the invention to provide a simple, cost effective, linear positioning system that allows coarse positioning and fine adjustment of more than one component on a linear (e.g. dovetail) alignment bar.

In optical applications, it is often desirable to be able to select from among a number of different available light sources. For example different light sources may be desired to change the wavelength of the light or to vary the intensity or power consumption, or simply to change the manufacturer for cost reasons. Alternatively the type of light source may be changed, e.g. from an LED to a laser or to an incandescent source.

However, different light sources have different attributes and different operating characteristics. In particular, the temperature of an LED affects its power output, its wavelength, its performance over its lifetime. Often operating at a stable temperature is key to obtaining repeatable performance. However, different LEDs (e.g. different wavelengths, different intensities, different manufacturers, etc.) each have their own particular temperature dependence. Also, maximum operating currents may vary e.g. from 20 mA to in excess of an Amp. Forward voltages may vary from below 2 volts to in excess of 10V. Wavelengths can vary from 200 nm to 1500 nm.

Therefore to control a particular LED it is necessary to know the attributes and characteristics of that particular LED. The controller has to be programmed for a particular LED. A controller can of course be programmed to accommodate several different LEDs and can switch between different control schemes as required. However, the user is then limited to the LEDs for which the controller has been programmed. If a new LED is released, the controller requires upgrading which may be time consuming or expensive.

One solution to this problem is to provide each LED with its own controller and its own sensors. The user then simply specifies the desired output and the on-board controller handles the rest. However, providing a dedicated controller with each LED is expensive and it does not provide as much flexibility for the end user. Indeed unless there is standardisation on the input parameters, the user is still faced with the problem of having to accommodate different interfaces.

It is an object of at least certain preferred embodiments of the invention to allow light sources with different attributes to be interchanged and controlled such that variations in their optical output are minimised or are controlled in a predictable manner. It is desirable to provide a driver that can accommodate a wide range of different devices.

According to a first aspect, the invention provides a positional adjustment mechanism comprising: a movable plate; a first positioning actuator; a second positioning actuator; and a biasing member arranged to bias the movable plate against both the first and second positioning actuators; wherein the movable plate has: a first flat surface facing the first positioning actuator; a second flat surface facing the second positioning actuator; and a third flat surface facing the biasing member; wherein the first flat surface is substantially perpendicular to the second flat surface, and wherein the third flat surface is not substantially perpendicular to either the first flat surface or the second flat surface.

With the biasing member pressing on the third flat surface which is at an angle to both of the first and second flat surfaces, the biasing member holds the movable plate securely against both the first and second positioning actuators. As both of these positioning actuators engage with flat surfaces which are perpendicular to one another, the two positioning actuators can be used to move the movable plate in two perpendicular directions. For example, adjustment of the first positioning actuator towards the movable plate will cause the positioning actuator to press on the plate, thus moving the plate in the direction perpendicular to the first surface. The second flat surface of the plate is parallel to the direction of this movement and will slide against the second positioning actuator without inducing any movement of the plate in any other direction.

The biasing force from the biasing member keeps the movable plate in contact with the first and second positioning actuators throughout movement, minimising backlash in positional adjustments and allowing the movable plate to be moved by drawing the first and/or second positioning actuators away from the movable plate (the plate following the appropriate movement under the biasing force from the biasing member).

The third flat face forms an acute angle with both the first and second flat faces. The three flat faces may each form a part of a side of a right angled triangle. The angle between the third flat face and the first flat face need not be the same as the angle between the third flat face and the second flat face. For example they may be at 20 degrees and 70 degrees respectively, or they may be at 30 degrees and 60 degrees respectively, or at 40 degrees and 50 degrees respectively. This will have no effect on the sensitivities of the first and second actuators, but will affect the way that the force from the biasing member is distributed between them, making it easier to adjust the movable plate one in one direction. However, this is unlikely to be of interest in the majority of applications and therefore it is preferred that the third flat face forms about an equal angle with both of the first flat face and the second flat face. For a right angled triangle, this makes for angles of about 45 degrees with each face.

It will be appreciated that the angle of the third flat surface with respect to the first flat surface may be adjusted on a continuous scale. Therefore, in preferred embodiments the third surface forms an angle of between 20 and 70 degrees, preferably between 30 and 60 degrees, more preferably between 40 and 50 degrees with the first flat surface. Most preferably the third flat surface forms an angle of about 45 degrees with the first flat surface (and preferably also with the second flat surface).

Preferably at least one of the first actuator, the second actuator and the biasing member has a flat surface facing the movable plate and being in sliding engagement with a flat surface of the movable plate. The engagement of two flat surfaces with each other prevents rotation of the movable plate while it undergoes translation as one or both of the positional actuators are adjusted. The sliding engagement of these two faces allows for the movable plate to slide when its movement is not exactly perpendicular to the plane of the two faces. This sliding interface may be formed at any of the three flat surfaces described above, i.e. those in contact with the first positioning actuator, second positioning actuator and biasing member. So long as two flat surfaces are provided in sliding engagement at one of these contact points, rotation will be effectively prevented. For example one of the first and second positioning actuators may have a flat surface facing the first or second flat surface of the movable plate respectively. However, for convenience, it is preferred that the biasing member has a flat surface facing the movable plate and being in sliding engagement with the third flat surface of the movable plate. The first and second positioning actuators can then be formed from smaller and lighter components and can, if desired, be easily rotatable for adjustment. For minimum friction it is also then preferred that the first positioning actuator and the second positioning actuator have a low friction tip in engagement with the movable plate so as to minimise friction between the two surfaces as the movable plate moves with respect to the actuators. The low friction tip may be a pointed or rounded surface for minimum contact area, or it may be a rotating bearing to form a rolling engagement rather than a sliding engagement. Preferably the flat surface of the actuator or biasing member provides sufficient engagement with the opposed flat surface of the movable plate to prevent rotation of the plate upon movement of one or both of the actuators, i.e. these surfaces remain engaged so as to ensure that the plate maintains its orientation. Preferably the engagement length (the length measured in a plane parallel to the plate surfaces) extends such that the forces from the actuators and bias members do not result in a moment that could cause rotation or pivoting of the plate. In some embodiments it is preferred that this length is at least as long as the maximum distance between the other two of the actuators and biasing member. However, this may be unduly cautious and therefore in other embodiments the engagement length is preferably at least 50% or at least 75% of the maximum distance between the other two of the actuators and biasing member.

Preferably the biasing member is biased against the movable plate by at least one biasing element. The biasing element may be any form of force-providing element that is arranged to provide a biasing force to the biasing member (and thereby to the movable plate). For example it may be a resilient element such as a spring (e.g. a coil spring or leaf spring), or it may be pressurised fluid or some other mechanical means (e.g. a lever using gravity to provide the biasing force). Preferably the biasing member is arranged to push against the movable plate so as to press the movable plate against the first and second positioning actuators.

The mechanism preferably further comprises a body arranged such that the movable plate is slidable relative to the body. The body thus partially contains the movable plate and allows relative positioning of the other elements of the mechanism such as the positioning actuators and the biasing member.

The mechanism may further comprise a cover plate mounted to the body such that the movable plate is slidable between the body and the cover plate. The movable plate is therefore sandwiched between the cover plate and the body, holding it in place and preventing movement perpendicular to its intended movement directions.

In use, an element may be mounted to the movable plate such that movement of the plate causes movement of the element. For example in an optical apparatus the element may be a light source (such as an LED) or a lens or prism. Alternatively the element may be a complex element comprising several sub-elements (e.g. a light source and a lens). This element may be attached to the movable plate via an extension of the plate that extends beyond the body and cover plate (so as not to be blocked by them), but in some preferred embodiments it is mounted directly on the movable plate. In the latter case, the body preferably has an aperture in the face parallel to the movable plate so that the element can be seen or accessed through the body. Similarly the cover plate may have an aperture in the face parallel to the movable plate. In certain embodiments such as in the case of a light source it may only be necessary to provide one aperture in either the body or the cover plate. However in other examples (e.g. a lens that is an intermediate component of an optical system) both apertures may be required. In addition the movable plate may need to have an aperture with the element mounted therein, e.g. so that light can pass therethrough.

In some embodiments, the mechanism may comprise one or more secondary biasing means, e.g. biasing elements that bias the movable plate against either the body or the cover plate. In particularly preferred embodiments at least one of the body or cover plate is made from a ferrous material and the movable plate comprises at least one magnet thereon. The magnet(s) are then the secondary biasing elements. The magnet(s) pull (or push) the movable plate into close contact with the ferrous material so that they are in close contact. This ensures a consistent positioning of the movable plate (and thus any element mounted thereon) in the direction perpendicular to the positioning actuators, even in the presence of temperature changes. For example, where the body and the cover plate are made from different materials, there may be differential expansion which could lead to the movable plate not being firmly sandwiched between the two parts. The magnet(s) ensure that the movable plate remains firmly in contact with one of its adjacent parts (the body or the cover plate).

Alternatively the movable plate could be made from a ferrous material with magnets mounted on either the body or the cover plate. However, for a compact arrangement, the body and the cover plate are preferably formed too thin to accommodate magnets, whereas the movable plate will general be thicker and able to accommodate the magnets.

Further, alternatives to magnets may be used to ensure correct alignment. For example springs could be used in place of magnets or fluid pressure could be used to ensure contact with either the body or cover plate (although this adds the requirement for sealing components). Another alternative is to form one flat surface of the movable plate at a non-perpendicular angle to the faces of the movable plate and to form the corresponding actuator or biasing member with a matching angled face for contact therewith such that the face of the actuator or biasing member biases the movable plate against either the body or cover plate (preferably the body so that the movable plate remains in place when the cover plate is removed). The non-perpendicular angle may be at least 30 degrees, preferably at least 40 degrees. In such embodiments the plate may comprise one or more grooves in its perimeter adjacent to the at least one of the position actuators (and preferably both) such that the actuator(s) run in the groove(s) and keep the movable plate firmly against the body or cover plate (i.e. preventing the movable plate from popping out of position).

The first and second actuators may be threaded and they may be mounted in threaded bores in the body. Rotation of the actuators will then cause a displacement that in turn displaces the movable plate. In alternative embodiments the first and second actuators may be electromagnetically or hydraulically or pneumatically moved. Alternatively, rotary cams, linear motors or piezoelectric devices may be used to move the positioning actuators. In the case of screws (or other threaded elements), lock nuts may be provided to fix the actuators in a particular position for an extended period (e.g. to resist further accidental movement).

In preferred embodiments the body comprises a groove and the biasing member comprises a shaft that is slidably arranged in said groove. The groove constrains the movement of the shaft and defines the axis of its movement. As described above, in preferred embodiments a sliding interface of two opposed flat surfaces is formed by a flat surface on the end of the biasing member and the third flat surface of the movable plate in order to prevent rotation of the plate. The accuracy of the angle of the groove defines the accuracy of the movement of the biasing member and the quality of the fit of the shaft to the groove impacts the quality of the movement. For example, if the angle of the shaft were not perpendicular to the sliding edge of the movable plate, the movement would be poorly defined and the plate would have a tendency to rotate. Also, if the shaft and groove were a poor fit (e.g. the groove were too big), the movable plate would not move in a smooth, consistent way and would suffer from play in its movement.

The groove is preferably substantially perpendicular to the third flat face. Thus in particularly preferred embodiments the groove is at 45 degrees to each of the first and second flat faces of the movable plate.

Although the biasing member may be biased by any number of biasing elements (including a single biasing element), the biasing member is preferably biased against the movable plate by two biasing elements, positioned symmetrically either side of the shaft. Having the biasing elements (e.g. springs) equally disposed either side of the shaft gives optimal quality of movement.

Graticules may be marked on to the device body and/or the moveable plate to allow the measurement and/or monitoring of the position of the movable plate. Graticules may be provided on both the body and the movable plate or they may be provided on a single piece with just a reference mark on the other. Markings on the two parts may form a vernier measurement scale.

According to another aspect the invention provides a method of adjusting a movable plate, comprising: adjusting the position of a first positioning actuator; and adjusting the position of a second positioning actuator, wherein a biasing member biases the movable plate against both the first and second positioning actuators; wherein the movable plate has: a first flat surface facing the first positioning actuator, a second flat surface facing the second positioning actuator, and a third flat surface facing the biasing member; wherein the first flat surface is substantially perpendicular to the second flat surface; and wherein the third flat surface is not substantially perpendicular to either the first flat surface or the second flat surface.

According to another aspect, the invention provides an adjustable mount comprising: a support; a fixed bar mounted to the support; an axially movable bar extending from the support and being axially movable relative thereto; and a first element movably mounted to the fixed bar and movably mounted to the movable bar; wherein the first element is selectively fixable relative to the fixed bar and is selectively fixable relative to the movable bar.

The element may be a component of an adjustable system or it may be used for mounting a component of an adjustable system. For example, in an optical system, the element may be used to mount a light source (e.g. bulb, LED, laser, etc.) or a lens or prism or an optical detector (photodiode, CCD, etc.). As the element can be selectively fixed to either or both of the fixed bar and movable bar, there is a great degree of freedom in adjusting the position of the element. For example in an optical system this may be used to adjust the position of a component along the optical axis.

With the element disengaged from both the fixed bar and the movable bar the element can be moved by hand (e.g. slid along both bars) to provide a coarse positioning. To fine tune the positioning, the element can be fixed to the movable bar and the movable bar can be axially adjusted to adjust the position of the element(s) mounted thereto. During this adjustment process the element may be completely disengaged from the fixed bar or it may be frictionally engaged with the fixed bar to the extent that its axial movement is not prevented, but that rotation (and other off-axis movement) is restricted. When the final desired position is attained, the element may be firmly fixed to the fixed bar so as to maintain that position. At this stage the element may remain in engagement with the movable bar (preventing further movement of the system), or it may be disengaged from the movable bar, thereby allowing the movable bar to move other elements attached thereto relative to the fixed element. In this way the overall position of several different elements can be attained with a high degree of accuracy. At the same time the relative positioning of several different elements can be adjusted via a simple adjustment system.

The first element may comprise a first gripping device for gripping the movable bar. Likewise, the first element may comprise a second gripping device for gripping the fixed bar. The use of gripping devices as opposed to other fixing means such as pins and sockets is that the gripping device can engage with the bar at any point along the bar on a continuous scale, allowing very fine and accurate positioning. Gripping devices can also be controlled (i.e. actuated) from one side and can generally be arranged to apply a varying degree of force. This can allow varying degrees of tightening ranging from a mild degree that slightly resists further movement, but does not prevent it to a strong degree that prevents further relative movement (at least without excessive force being applied). Such variable gripping may be used for both the first and second gripping devices. However it is particularly beneficial for the second gripping device as it may be desired to engage elements in a slidable fashion with the fixed bar during the adjustment process as described above. When it comes to the movable bar it is generally preferred for an element to be engaged either firmly or not at all. Therefore in preferred embodiments the second gripping device is adjustable in the degree of gripping that it applies to the fixed bar. The first gripping device may be a pin that is biased against the movable bar. The gripping pin may be biased by a separate biasing member such as a driving rod or it may be the driving rod itself. The driving rod may be an externally threaded rod such as a screw mounted in an internally threaded bore, drivable by using a screw driver, hexagonal key or the like. Alternatively the driving rod may be driven electromagnetically, pneumatically or hydraulically for example. The same applies to the second gripping device. If a set screw is used with a gripping pin then the set screw preferably has a flat tip to avoid distortion of the gripping pin.

The second gripping device may alternatively comprise a gripping body with a friction surface flexibly attached to the first element and an actuator arranged to bias the friction surface against the fixed bar. Essentially the gripping pin discussed above is replaced by a gripping body. The gripping body may be integrally formed with the first element. For example it may be an area of material with a gap substantially separating it from the rest of the first element except at a connecting stalk or neck that flexes so as to permit the gripping body to move relative to the first element so as to move between a gripping position and a non-gripping position.

The fixed bar may be a dovetail bar. Such bars are often used for slidably mounting an adjustable element. The dovetail bar typically has a trapezium shaped cross-section with the wide and narrow edges arranged such that an element mounted thereon cannot simply be lifted off (the narrow end being closer to the edge of the element than the wide end. However it will be appreciated that the invention is not limited to a dovetail bar and may use a bar with any shaped cross-section. The fixed bar may be mounted along its length to a support structure, or alternatively it may be mounted in cantilever fashion from one end (i.e. mounted to a support element at one end, but with the opposite end not mounted to a support).

The movable bar may be of substantially circular cross-section. This makes for easier manufacture of the element to be mounted thereon as these simply require drilling. However, in some preferred embodiments the movable bar may have a non-circular cross-section which is matched by the hole provided in the mounting elements (e.g. a square cross-section or an oval or elliptical cross-section). The non-circular cross-section prevents rotation of the movable bar which can be useful with the threaded arrangements discussed below.

The movable bar is preferably mounted at one end to a support in cantilever fashion. Such cantilever mounting allows the movable bar to extend and retract axially such that its distal end moves further from or closer to the support to which the bar is mounted.

The movable bar may be adjustable in any fashion. For example it may be moved mechanically by a lever, or it may be driven electromagnetically, hydraulically or pneumatically. In some preferred embodiments the movable bar comprises an inner shaft with an outer cylinder movably mounted thereon. The inner shaft may be fixed to the support such that it does not move axially, while the outer cylinder is axially movable relative to the support. Preferably the outer cylinder has a smooth outer surface for engagement with the first gripping device of the first element. The smooth outer surface provides a uniform engagement surface along the whole length so that the mounting element may be fixed thereto with consistent gripping characteristics.

The outer cylinder may be internally threaded and the inner shaft externally threaded such that relative rotation of the inner shaft and the outer cylinder causes relative axial movement of the outer cylinder. The axial movement of the outer cylinder can then be controlled by an adjuster attached to the inner shaft. The inner shaft is thus preferably rotatably mounted to a support and is preferably rotatable via a rotary adjustment mechanism. This adjustment mechanism may take the form of a knob or a screw head (e.g. a flathead, crosshead or hexagonal head, etc.). Equally, the rotation of the inner shaft may be controlled by an electric motor. It will be appreciated that the knob or screw head may be integrally formed with the rest of the inner shaft.

The adjustable mount may further comprise an anti-backlash biasing member arranged to bias the movable bar towards or away from the support. This may comprise a spring loaded mechanism, e.g. a compression spring around the inner shaft between the inner shaft and the support.

The movable bar may be mounted to the support in cantilever fashion. The movable bar may have a short taper formed on its distal end. The taper may be in the form of a short partial cone surface and facilitates fitting of mounting elements thereto.

While the fixed bar may be mounted to a support, additional support members may be mounted to the fixed bar to provide added stability and to provide mounting points for other structures. In particular, a support element fixed to the fixed bar may be the support to which the movable bar is mounted. This support element therefore defines and maintains the position of the movable bar in relation to the fixed bar. The support element may be fixed to the fixed bar in the same way as other elements, e.g. using a gripping pin and a driving rod (such as a screw).

Although the system is perfectly suitable and usable with a single element mounted thereto, the adjustable mount preferably further comprising: a second element movably mounted to the fixed bar and movably mounted to the movable bar, wherein the second element is selectively fixable relative to the fixed bar and is selectively fixable relative to the movable bar. The system has particular benefits when used with more than one element as it allows accurate positioning of each element individually and accurate positioning of those elements in relation to each other and it also allows movement of two or more elements mounted to the adjustable bar while maintaining their relative separation. Of course the system may also be extended to three or more elements.

While for the best precision each element should be mountable and fixable to the movable bar so that its position can be adjusted with high accuracy, there may be components which do not require such highly accurate positioning. For example a heater component or a fan component used to heat or cool other components, optical filters or components for mounting an external casing may not need such accurate positioning and can be placed more approximately simply by manual movement along the fixed bar. These elements may only be mountable and adjustable relative to the fixed bar. Of course they may require an opening through which the movable bar can extend and move, but need not be fixable relative to the movable bar.

The fixed bar and the movable bar act as two alignment devices. Due to production tolerances, these may be slightly misaligned to a certain degree. One option to reduce such misalignment is to machine the two bars to a high precision, but this is expensive. However, as the fixed bar is used as the main alignment device, with the movable bar being used to adjust the position along the fixed bar, the movable bar can have a degree of accommodation built in. In the case of a threaded outer cylinder and a threaded inner shaft a lower tolerance thread may be used that can allow some movement between the two parts. For example if there is a slight misalignment between the fixed bar and the movable bar such that the two bars are not parallel, a lower tolerance thread in the movable bar will allow a slight movement in the plane perpendicular to the axis of the bar which accommodates the misalignment and avoids elements moving along both the fixed bar and the movable bar from becoming jammed.

The invention further extends to a mounting element comprising: a first cut-out for mounting the element on a movable bar; a second cut-out for mounting the element on a fixed bar; a first engagement device for selectively fixing the mounting element to the movable bar; and a second engagement device for selectively fixing the mounting element to the fixed bar. Such a mounting element is suitable for mounting to the adjustable mount described above.

In preferred embodiments the first engagement device comprises a first gripping rod mounted in a first bore in the mounting element and a first actuator arranged to vary the force applied to the first gripping rod to vary the friction force between the first gripping rod and the movable bar. Similarly the second engagement device preferably comprises a second gripping rod mounted in a second bore in the mounting element and a second actuator arranged to vary the force applied to the second gripping rod to vary the friction force between the second gripping rod and the fixed bar. Alternatively the second engagement device may comprise a flexible gripping part integrally formed with the mounting element and an actuator arranged to vary the force applied to the gripping part to vary the friction force between the gripping part and the movable bar. As described above, the flexible gripping part may be separated from the main body of the mounting element by a gap except at the point of attachment which may be formed from a relatively thin neck or stalk.

It will be appreciated that these features may also apply to the positional adjustment mechanism described above in that the positional adjustment mechanism may be part of an element mounted to the fixed and movable bars.

Another aspect of the invention provides a method of adjusting a first element on an adjustable mount comprising: attaching said first element to an axially movable bar; axially adjusting the movable bar; attaching said first element to a fixed bar. Preferably the method further comprises: releasing said first element from said movable bar. Preferably the method further comprises: attaching a second element to said movable bar; axially adjusting said movable bar; attaching said second element to said fixed bar. Alternatively, the method may further comprise: attaching a second element to said movable bar; axially adjusting said movable bar; attaching said first element to said movable bar; and axially adjusting said movable bar.

It will be appreciated that all of the features described above also apply to the method.

According to a further aspect, the invention provides a light source module comprising: a light source; a memory storing attributes of the light source; an interface arranged to: receive a request for information from the memory; output requested information from the memory; and receive control signals to operate the light source.

Having an on-board memory storing the key parameters and characteristics of the light source allows the module to be used in an interchangeable fashion by a generic controller. An off-module controller can be connected to the module via the interface and can then interrogate the memory to obtain the necessary parameters that it needs to control the light source. The module need not be shipped with a built in controller and indeed preferably has no light source controller thereon. The user has a high degree of control over the selected module as well as being able to swap the module easily for a different module.

In preferred embodiments the memory stores at least one of: target operating temperature of the light source; maximum operating temperature of the light source; minimum operating temperature of the light source; maximum operating current;

maximum voltage drop. These are some of the most important characteristics that determine the appropriate control of the light source and enable the controller to perform its function. Although not all of these parameters will be required in all circumstances (e.g. for all light sources), they will often all be required. This is generally the case for light emitting diodes. Therefore in preferred embodiments the memory stores all of: target operating temperature of the light source; maximum operating temperature of the light source; minimum operating temperature of the light source; maximum operating current; maximum voltage drop.

As mentioned earlier, the temperature of the light source can affect its operating characteristics and therefore can be an important element of control. While some light sources may not be at risk of high temperatures, or may be sufficiently temperature-controlled by passive cooling through heat sinks, other light sources will vary greatly in temperature depending on operating conditions. Also, while a temperature sensor may be arranged as a separate system component and not be required on the module itself, a more accurate temperature reading can be obtained by mounting the temperature sensor on the module, preferably in close proximity, e.g. adjacent to the light source. Therefore the light source module may further comprise a temperature sensor arranged to sense the temperature of the light source. The interface may also be arranged to output temperature information from the temperature sensor. Depending on the type of temperature sensor used, this information may be a digital signal or an analogue signal. As an alternative to a temperature sensor, an LED temperature may be determined from the forward voltage and current.

The light source module may further comprise a heater and the interface may be arranged to receive a temperature control signal which is used to control operation of the heater. In this way, the controller can use the detected temperature and responsively control the temperature by activating and deactivating the heater. Similarly the light source module may further comprise an active cooling device and the interface may be arranged to receive a temperature control signal which is used to control operation of the active cooling device. An active cooling device may be a thermoelectric cooler such as a Peltier cooler or a fan for example. If the module is provided with both a heater and an active cooler, it may not be necessary to receive separate heating and cooling signals (although this is an option). Instead a single temperature control signal may be received on the interface and a local controller on the module may be used to activate and deactivate the heater and cooler as appropriate. The received signal could be a simple command to heat or cool or it could be a desired temperature. In the latter case, an on-board local controller would need to work with an on-board temperature sensor to control the heater and cooler appropriately. The heater and/or cooler (thermoelectric or fan) can be adjustable over a range of settings (i.e. not simply on and off). A standard controller such as a PI (Proportional Integra), PID (Proportional Integral Derivative) or fuzzy logic controller may be configured to apply the most appropriate level of heating and/or cooling.

As mentioned above, the module may also have passive cooling such as a heat sink. A fan could be provided on the module, but this would preferably be a separate system component.

The memory could be a read only memory, with all necessary information written at the time of manufacture. However, it is also beneficial to allow the controller to store certain information on the memory such as usage information and therefore it is preferred that the memory is a writable memory. Therefore in some preferred embodiments the memory is a writable memory and is arranged to store at least one of: the current operating parameters of the light source; time in operation; time with drive current; time with temperature.

The stored current operating parameters may be used upon the next start up as the last known (and therefore initial) operating state. The other usage information may be collected to keep track of time-varying characteristics of the light source, e.g. characteristics which change with accumulated usage such as degradation that may occur with excessive high temperature operation or simply changes due to material changes that occur over time. For example the total on-time of the light source may be stored, or the total time in operation above a threshold current or temperature. A table may store the total time that the light source has been in operation within a number of current or temperature ranges. The memory may store a product of current and time (or an integral of current over time) or a product of temperature and time (or an integral of temperature over time). Accordingly it is also preferred that the memory stores at least one of: power derating as a function of usage information; wavelength as a function of temperature and/or current; optical power as a function of temperature and/or current; dissipated power as a function of temperature and/or current. These allow the system to respond to changing characteristics of the light source as the usage increases so that the light source can be operated appropriately and/or allowing inappropriate settings to be prevented or notified to the user (e.g. via warnings).

It will be appreciated that the light source may be mounted on an element of the adjustable mount described above for linear adjustment (e.g. Z-axis adjustability) and indeed may be mounted on a two dimensional positional adjustment mechanism as described above (e.g. for X-Y axis adjustability). In this way, full 3 dimensional adjustment can be achieved.

Another aspect of the invention provides a method of controlling a light source wherein the light source is provided on a module, the module also comprising a memory that stores attributes of the light source and an interface, the method comprising: requesting via said interface information from the memory; receiving via said interface information from the memory; and sending via said interface control signals to operate the light source. Preferably said control signals are based on said received information.

Certain preferred embodiments of the invention will now be described, by way of example only, and with reference to the accompanying drawings in which.

Figure 10A:
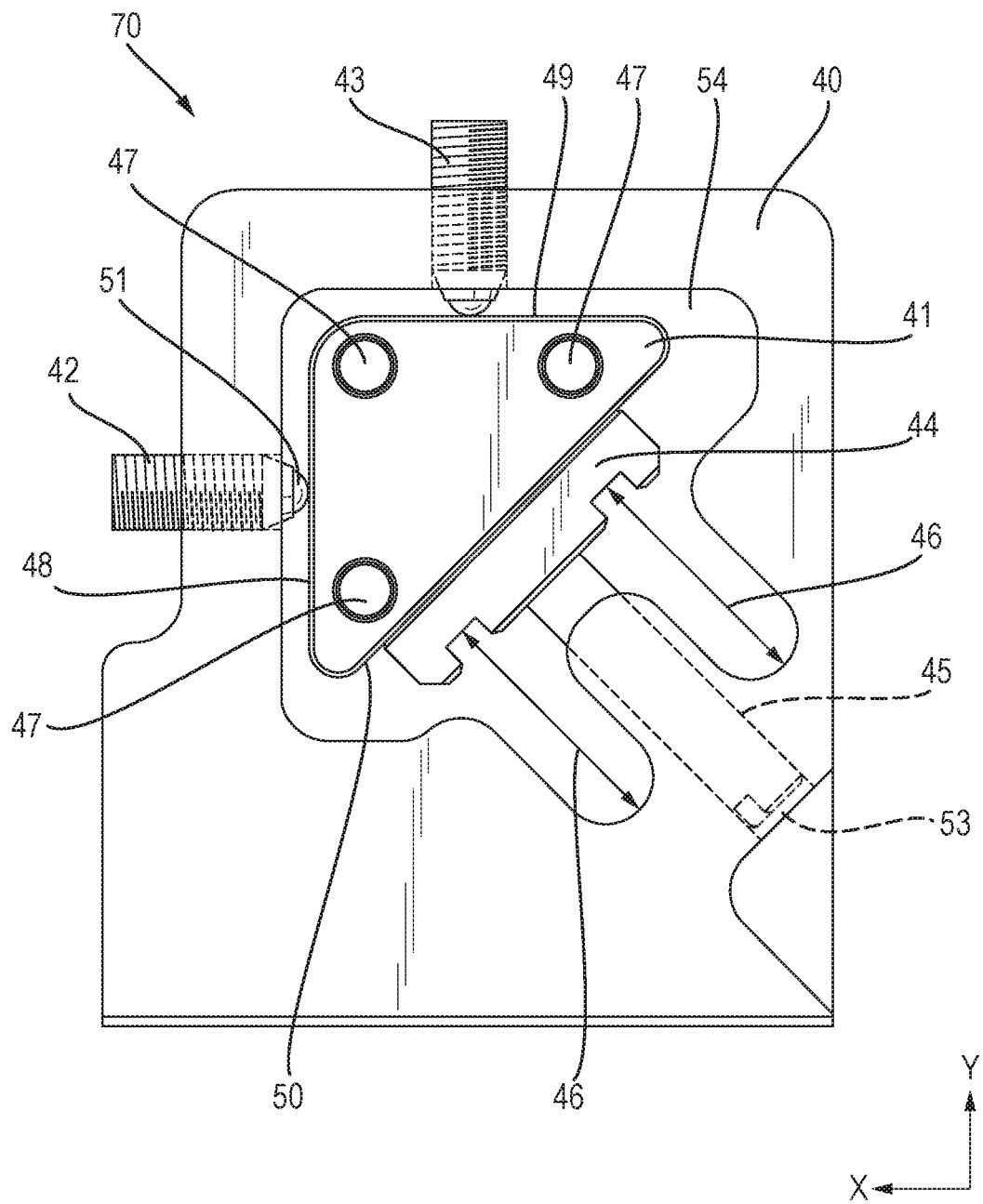
Figure 10B:
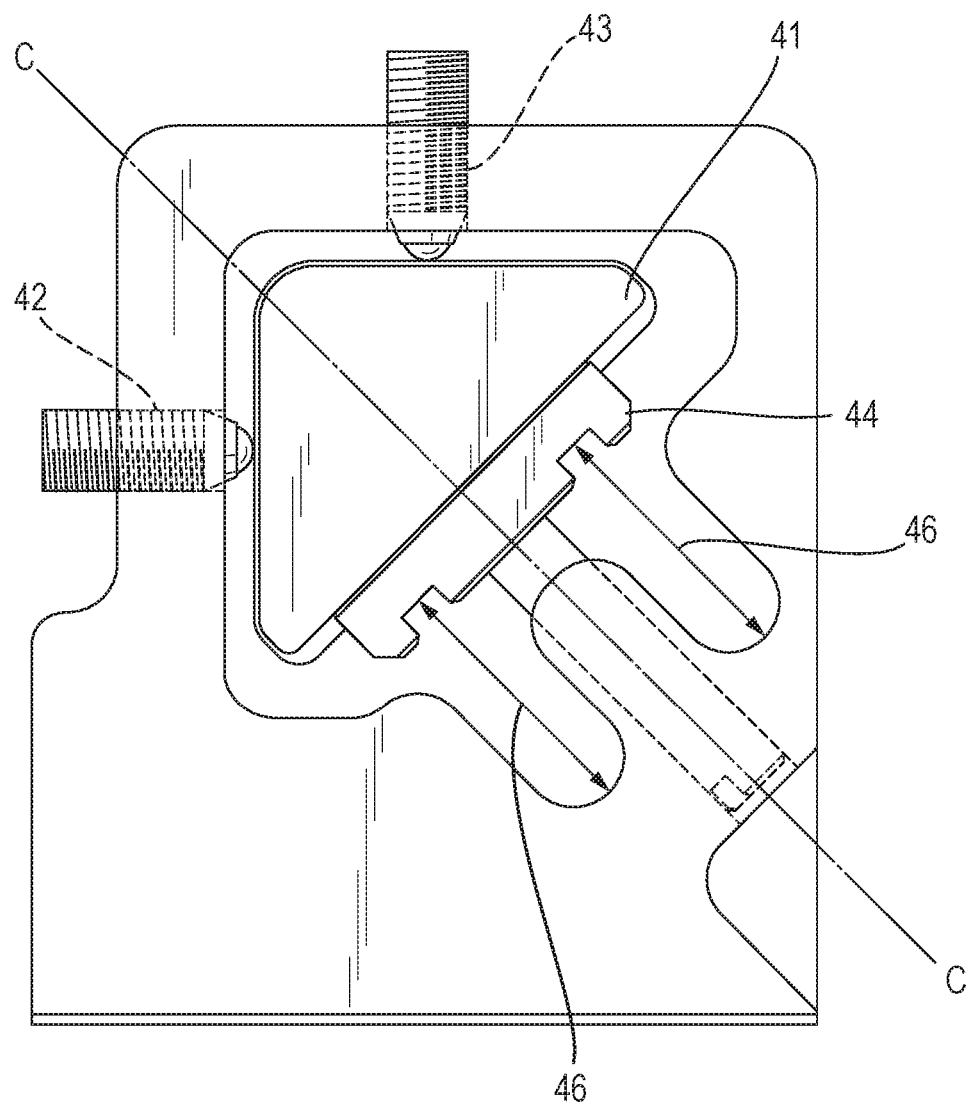
Figure 10C:
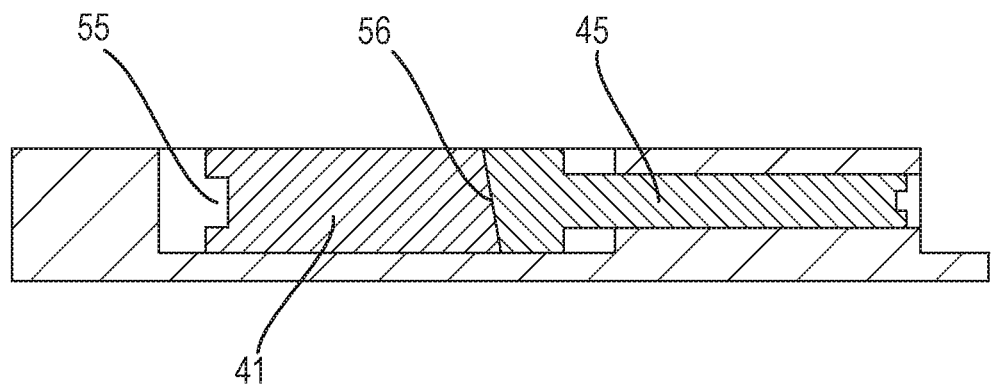
Figure 11:
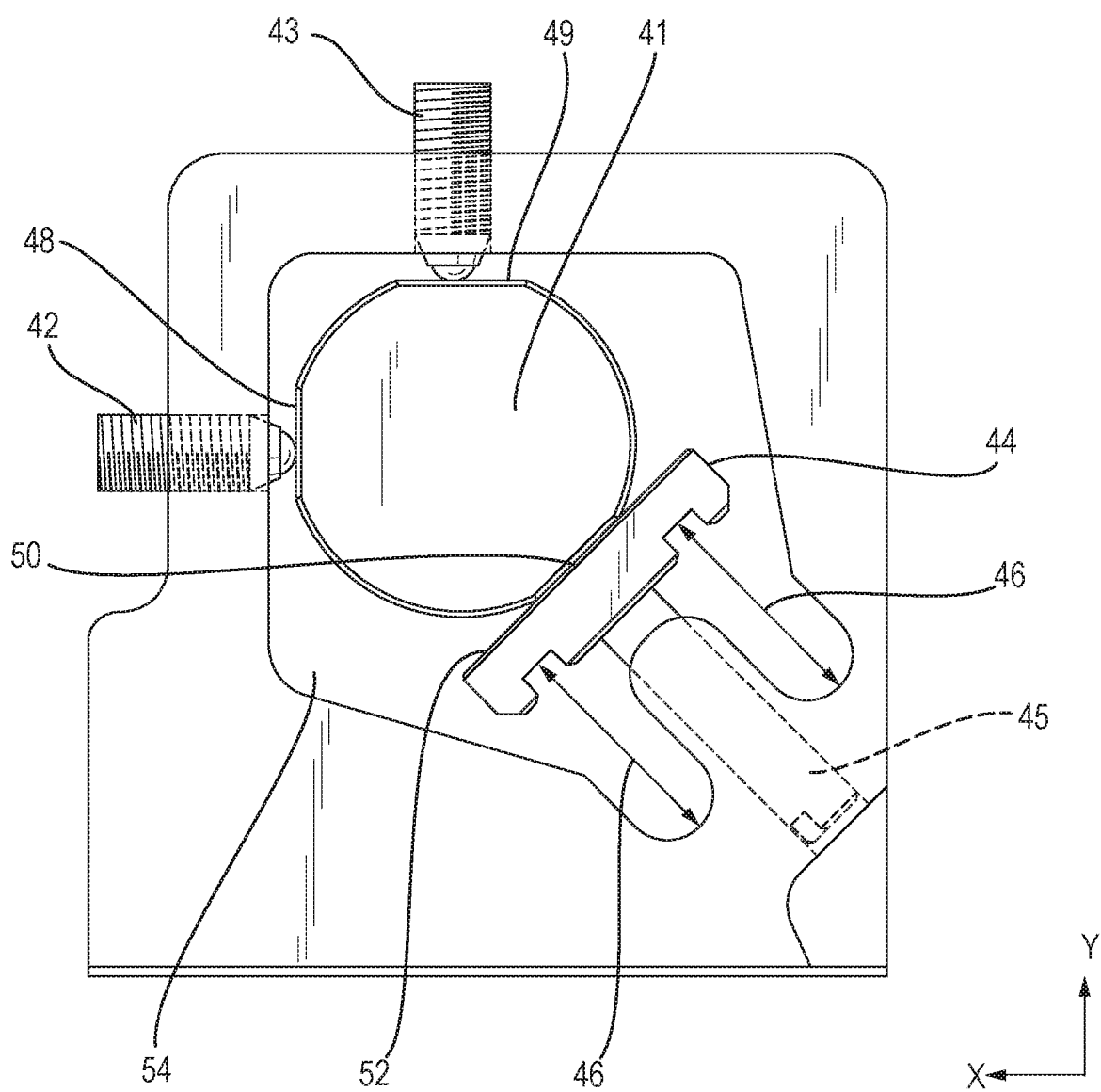
Figure 12:
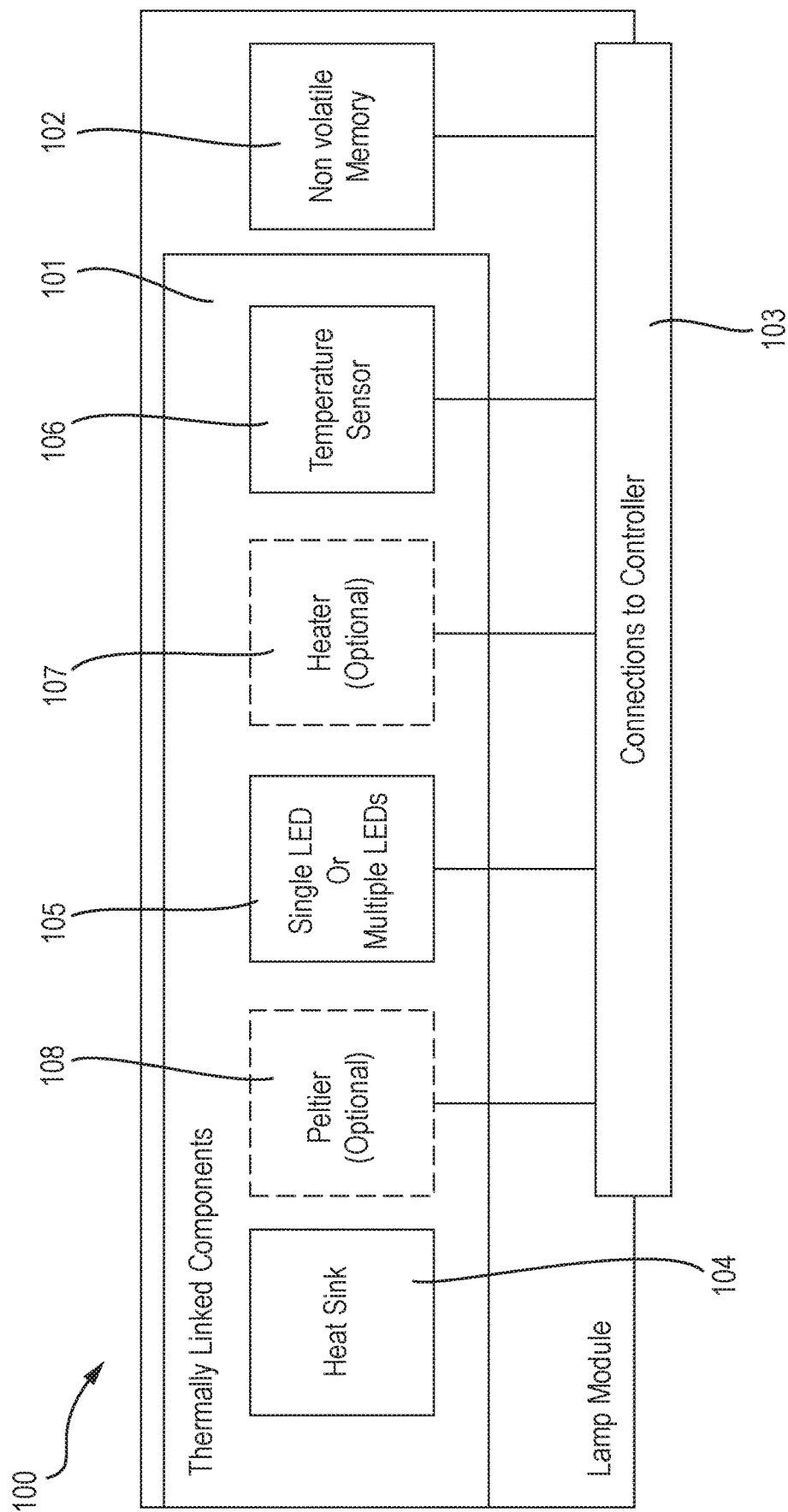
Figure 13:
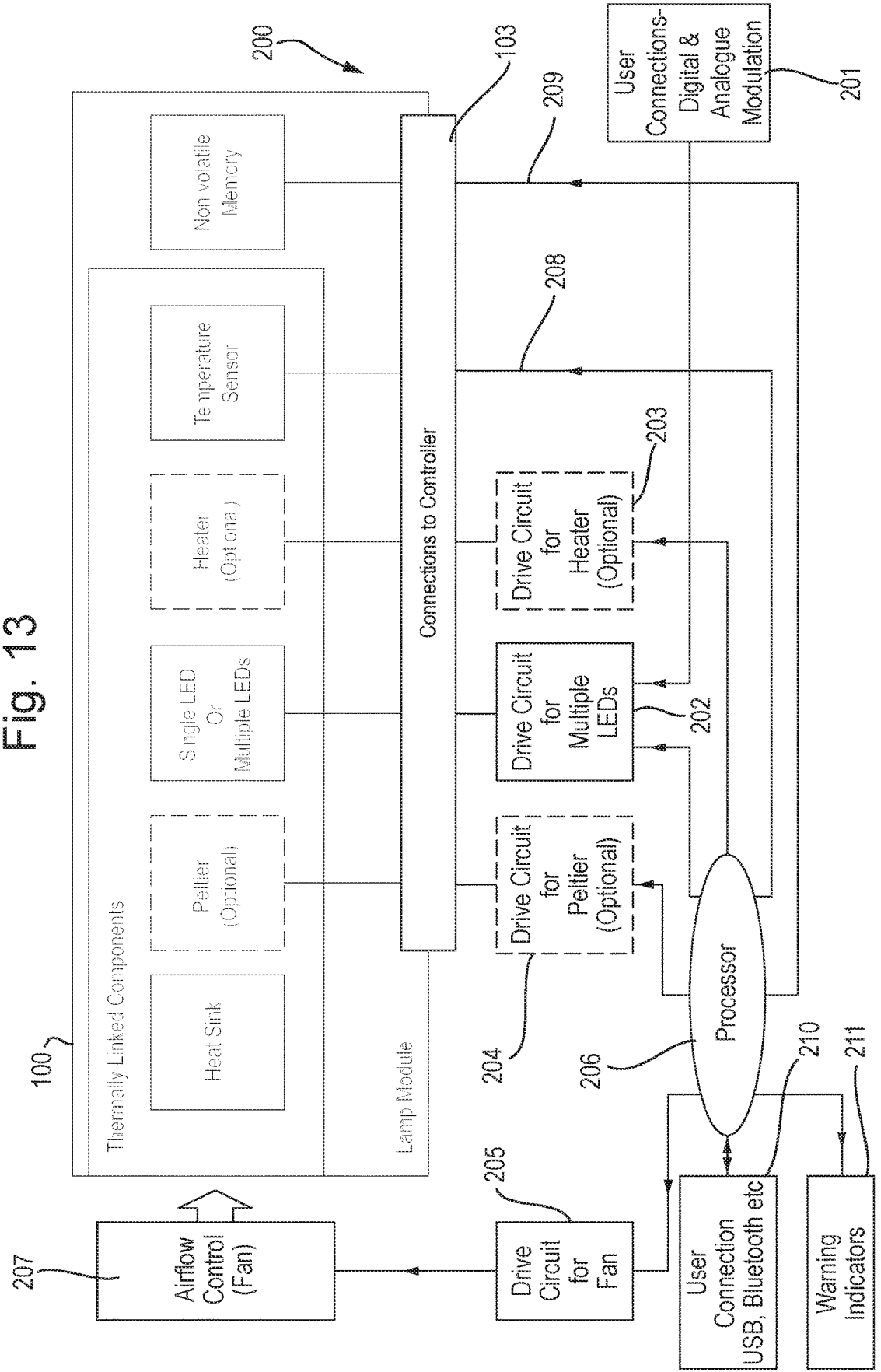

FIG. 10*a* shows a two-dimensional adjustment mechanism;

FIGS. 10*b* and 10*c* show a variation of the mechanism of 10*a*;

FIG. 11 shows a variation of the mechanism of FIG. 10*a*;

FIG. 12 schematically shows various components of a light modular light source system; and FIG. 13 schematically shows the control of the light source of FIG. 12.

Figure 1:
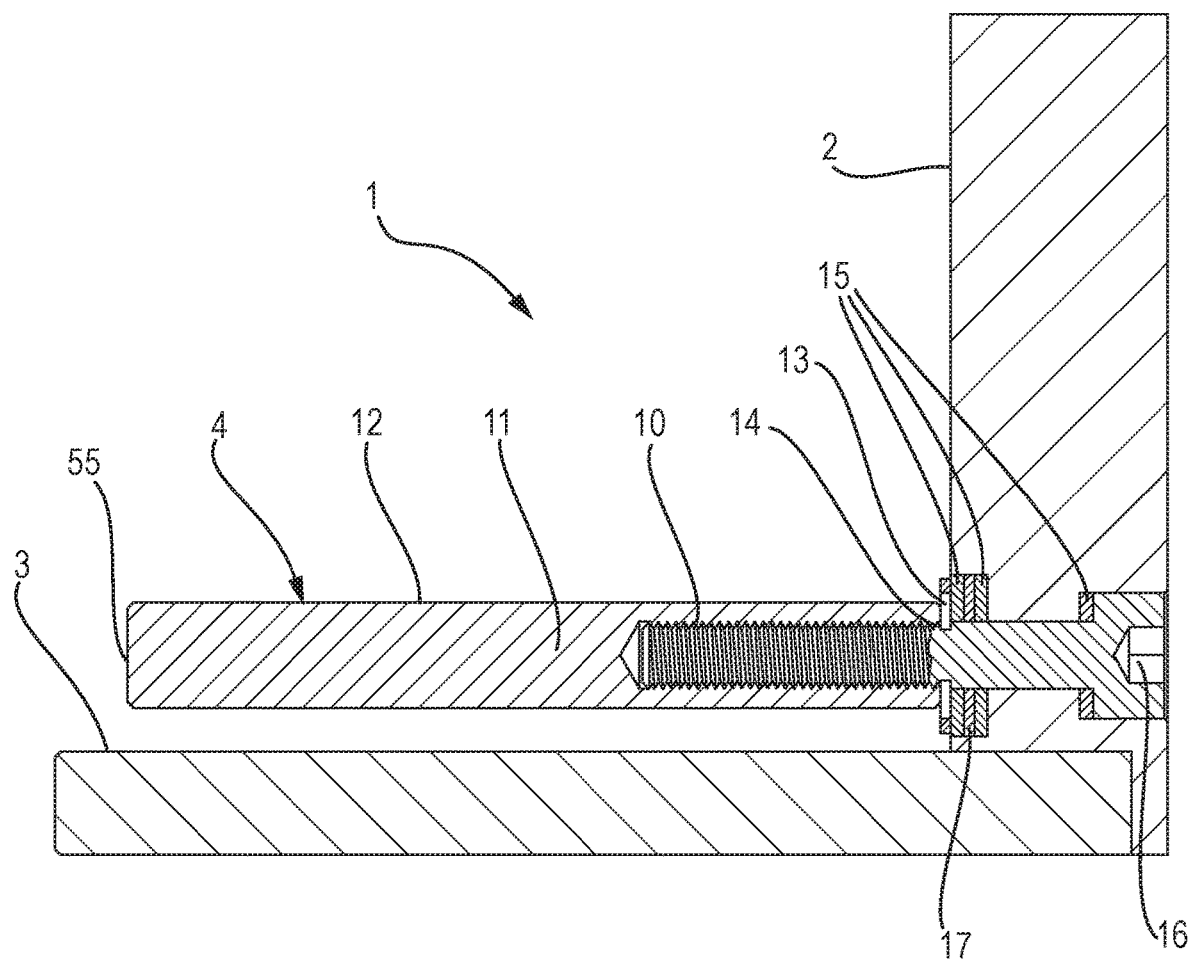
FIG. 1 shows a side cross-section of a linear adjustment mechanism.

FIG. 1 shows a side view of a linear adjustment mechanism for an optical apparatus such as an adjustable light source 1. A support member 2 is provided at one end of the apparatus 1. Extending horizontally outwards from the support 2 are two adjustment bars 3 and 4. The lower bar 3 is fixed relative to a main body that is not shown in the Figure. The support 2 is mounted firmly to the fixed bar so as to act as an additional supporting structure for the apparatus. The support 2 is not intended to be adjustable with respective to the support 2 in normal use. The fixed bar 3 is in the form of a dovetail (i.e. it has a dovetail shaped cross-section) with the narrow part of the dovetail at the bottom and the wider part uppermost. The other adjustment bar 4 is adjustable relative to the support 2 in normal use. The movable bar 4 comprises an outer cylinder 11 with a smooth outer surface 12 and an inner shaft 10. The outer cylinder 11 has an internal thread along at least a part of its length (the right hand side in FIG. 1) and the inner shaft 10 has an external thread so that the two parts 10, 11 can be screwed together or screwed apart by relative rotation of the two parts 10, 11.

The shaft 10 is rotatably mounted to the support 2 so that it can be rotated with respect to the support 2, but does not move axially with respect to the support 2 (axially referring to the axis of the shaft 10, i.e. perpendicular to the support 2). The shaft 10 passes through an aperture in the support 2 and is mounted on nylon washers 15 to minimise friction while rotating. These may be lubricated for further friction reduction. A clip 13 (e.g. a circlip or E-clip) is mounted in a groove 14 of the shaft 10 in close proximity to the surface of the support 2. Between the clip 13 and the support 2, a sprung washer 17 is provided, sandwiched between two nylon washers 15. The sprung washer 17 biases the clip 13 and the support 2 apart so as to maintain a consistent axial position of the shaft 10 with respect to the support 2, thus avoiding any undesirable play between the two parts. On the opposite side of the support 2, the shaft 10 is provided with a rotation mechanism 16 that facilitates rotation of the shaft 10. The rotation mechanism 16 may take the form of a shaped head of the shaft 10 such as a slot (or crossed slots) to receive a screw driver or a hex shaped cavity to receive a hexagon key. Of course any other suitably shaped interface may be used. Alternatively a simple rotation knob may be provided for manual turning. This provides the easiest adjustment, but is also more susceptible to unintentional adjustment by being knocked or brushed. It will also be appreciated that the adjustment mechanism 16 may be driven in any way, e.g. manually or electrically, e.g. via a motor.

Figure 2:
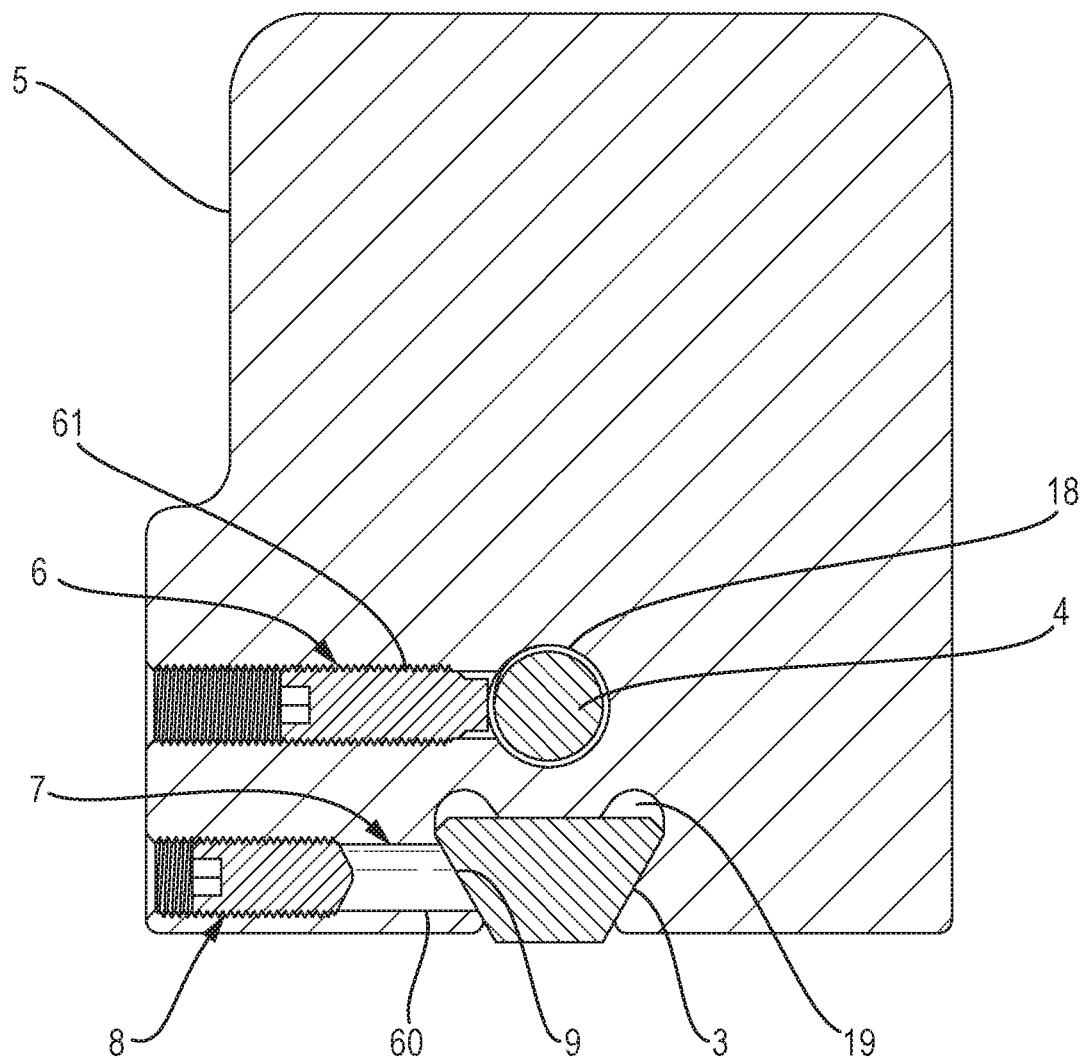
FIG. 2 shows a transverse cross-section of the linear adjustment mechanism of FIG. 1 with a movable element mounted thereto.

FIG. 2 shows an adjustable element 5 mounted to the fixed bar 3 and movable bar 4 of the adjustment apparatus 1. FIG. 2 is a cross-section taken through the element 5 in a plane perpendicular to the axes of the fixed bar 3 and movable bar 4. The dovetail shape of the fixed bar 3 can be seen clearly in this figure. The element 5 has a corresponding dovetail slot 19 formed on its lower edge to receive the dovetail bar 3. These shapes match closely, but are not such a tight fit as to prevent movement so that the element 5 can slide relative to the fixed bar 3 so as to be positioned at a suitable axial position along it.

Once the element 5 has been axially positioned at the desired location along the fixed bar 3, it can be fixed to the fixed bar 3 thus immobilising it relative to the fixed bar 3. This is achieved by means of a gripping pin 7 mounted in a bore 60 of the element 5 that is substantially perpendicular to the axis of the fixed bar 3 and extends out to the side of the element 5. The gripping pin 7 can be driven against the fixed bar 3 by a set screw 8 also mounted in the bore 60 at a portion that is internally threaded so as to permit axial adjustment of the set screw 8 within the bore 60. Thus set screw 8 acts as an actuator for the gripping pin 7. By screwing the set screw 8 in, the gripping pin 7 is squeezed against the fixed bar 3 thus increasing the frictional force between the two. In this way the element 5 is restricted from further movement relative to the fixed bar 3. Retraction of the set screw 8 releases the frictional engagement and permits movement of the element 5 with respect to the fixed bar 3 once more. The gripping pin 7 is preferably formed from nylon so as to minimise friction when it is not squeezed too hard against the fixed bar 3. The set screw 8 preferably has a flat tip to avoid distortion of the gripping pin 7. The gripping pin 7 may be engaged with the fixed bar 3 with a small degree of force sufficient to restrict play between the element 5 and the fixed bar 3, but not sufficient to fully prevent axial movement of the element 5 along the fixed bar 3. This arrangement provides good stability during the axial adjustment when desired. The gripping pin 7 has a slanted friction surface 9 on its end face adjacent to the fixed bar 3 and matching the angle of the side of the dovetail so as to provide a good contact area between the two parts.

A second bore 61 is also provided perpendicular to the aperture 18 of the element 5 which is designed to accommodate the movable bar 4 in use. The second bore 61 is also internally threaded so as to receive a second gripping pin 6. The second gripping pin 6 is externally threaded and therefore also forms a set screw without the need for separate set screw and pin as described above in relation to the gripping arrangement for the dovetail bar 3. It will be appreciated that either gripping arrangement may be used for either bar 3, 4. The second gripping pin 6 is preferably formed with a nylon tip to minimise friction between the movable bar 4 and the pin 6 when not firmly engaged.

Figure 3:
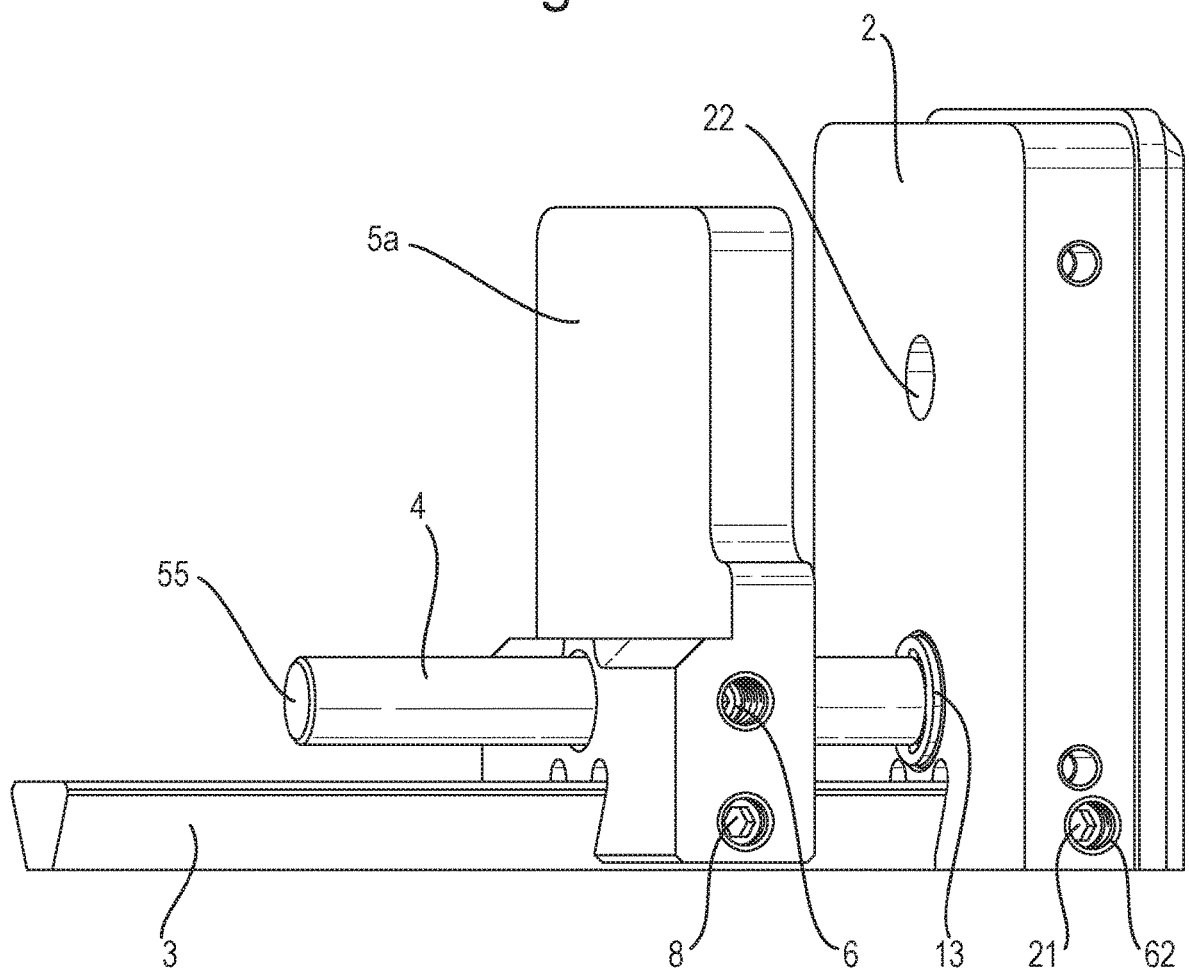
FIG. 3 shows a perspective view of the linear adjustment mechanism of FIGS. 1 and 2.
Figure 4:
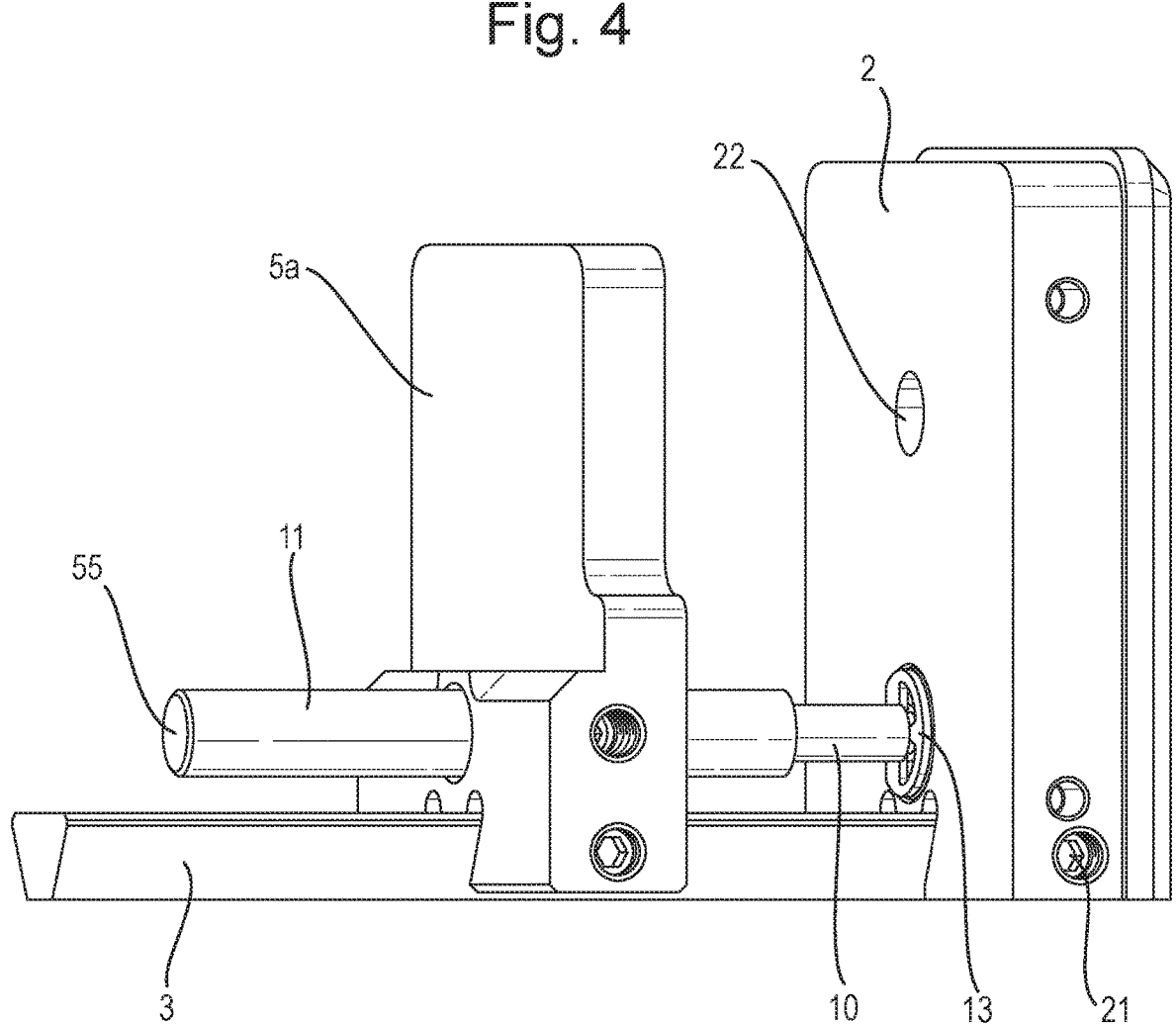
FIG. 4 is similar to FIG. 3 but showing movement of the movable bar.

FIGS. 3 and 4 illustrate the movement of an element 5a with respect to the support 2 and the fixed bar 3, using the movable bar 4 to cause and control the movement.

FIG. 3 shows the fixed rod 3 and movable rod 4, the movable rod 4 being mounted in cantilever fashion extending from the support 2. The movable bar 4 is mounted via the washers 15 and spring 17 as discussed above. The fixed bar 3 is mounted to a base unit (not shown) and the support 2 is mounted to the fixed bar 3 via a screw 21 inserted in a threaded bore 62 of the support 2. The screw 21 may engage frictionally with the fixed bar 3 in a similar way to that described above for fixing the element 5 to the fixed bar 3 or it may engage with a recess in the fixed bar 3 for a stronger fixing. Although not illustrated here, the base unit may also house further control electronics. Further, in another variation, a second support 2 may be provided at the opposite end of fixed bar 3. The two supports 2 may be arranged to mount an external housing or casing to protect the internal components. The casing may be easily removed in order to adjust the positions of elements mounted to the bars 3, 4 and re-installed once the desired configuration has been set.

FIG. 3 shows the element 5a mounted securely to the movable bar 4 by virtue of gripping pin 6 being firmly engaged with the external surface 12 of outer cylinder 11 of movable bar 4. The outer cylinder 11 is in its fully retracted position relative to the inner shaft 10, i.e. in close proximity to the support 2 and clip 13. The gripping pin 7 is in a non-gripping state, i.e. not pressing hard against the fixed bar 3 so that the element 5a is free to move axially along the fixed bar 3. The gripping pin 7 may be partially engaged as described above to restrict play between the element 5a and the fixed bar 3. FIG. 4 shows the position of the elements after the inner shaft 10 has been rotated through several rotations so as to screw the outer cylinder 11 away from the support 2. As the outer cylinder 11 moves axially along inner shaft 10 and away from support 2 the element 5a (which is secured to outer cylinder 11) is also moved axially along inner shaft 10 and away from support 2. The element 5a also moves with respect to fixed bar 3 during this motion. An aperture 22 in the support 2 is provided to allow interaction with the element 5a, e.g. to allow light transmission through the aperture 22 and onto the element 5a (or components mounted thereon).

Figure 5:
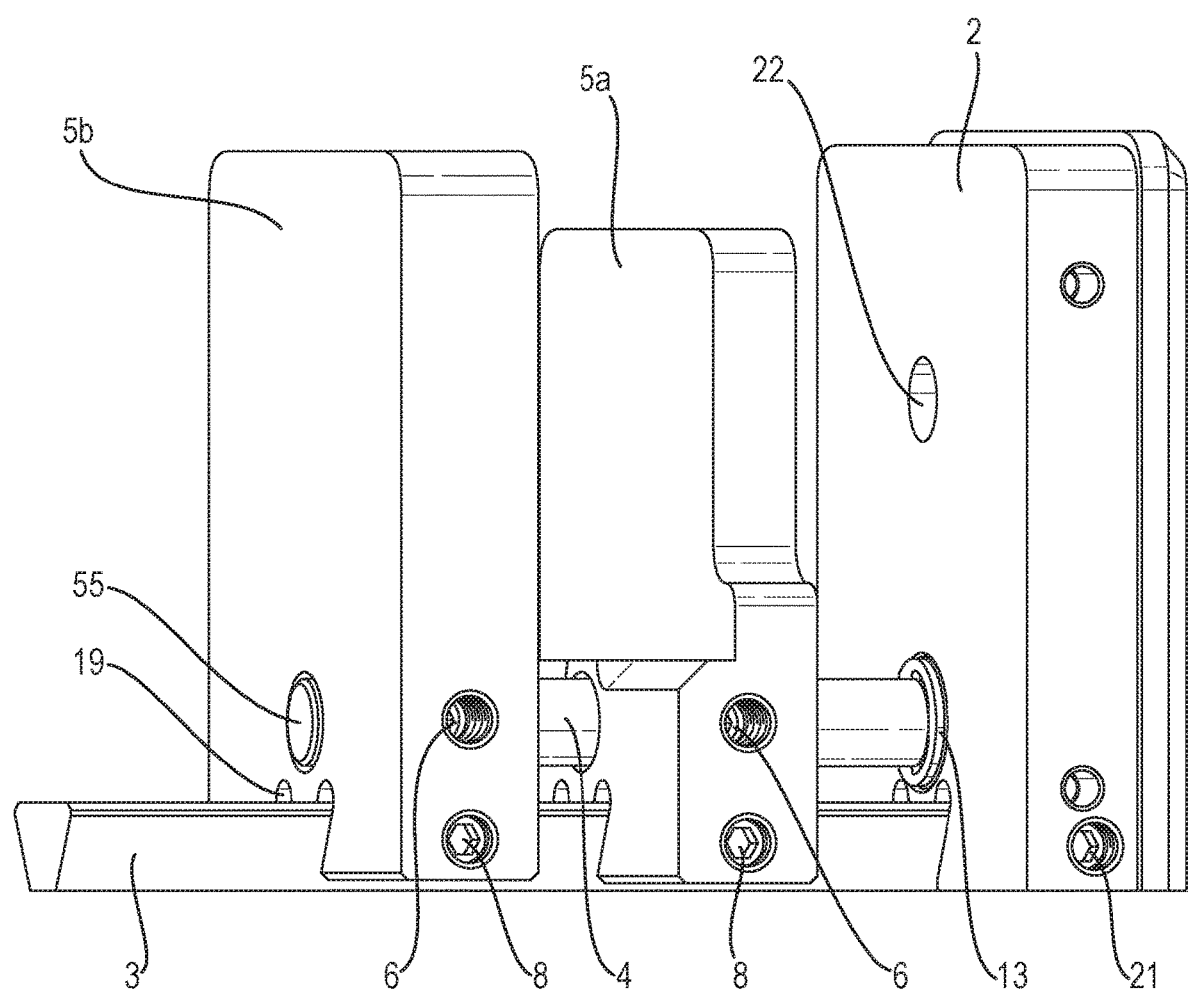
FIG. 5 is similar to FIG. 3 but showing two elements mounted to the adjustment mechanism.
Figure 6:
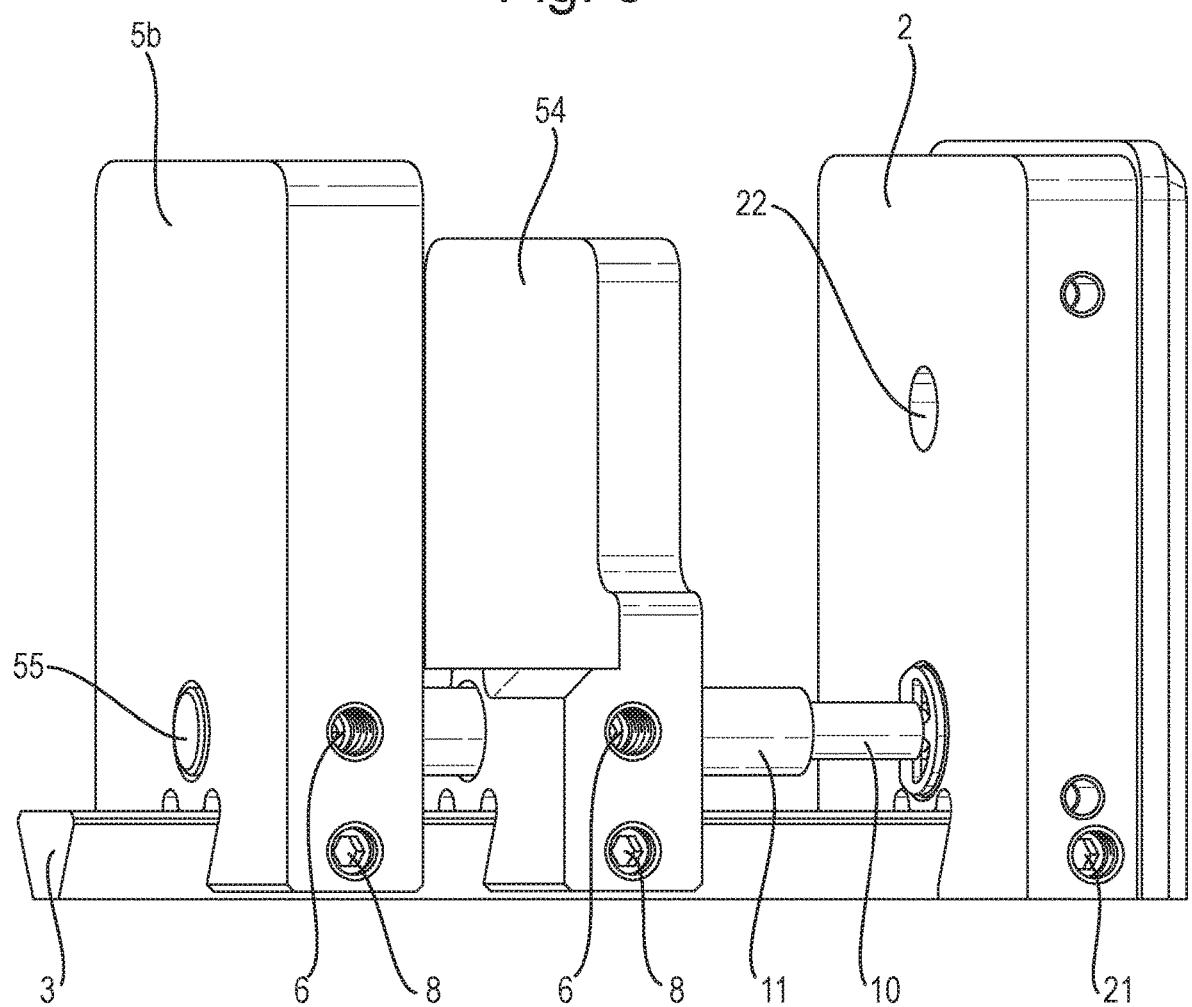
FIG. 6 is similar to FIG. 5 but showing movement of the movable bar.

FIGS. 5 and 6 are similar to FIGS. 3 and 4, but showing both a first element 5a and a second element 5b, both secured to the outer cylinder 11 and slidable along the fixed bar 3. The second element 5b is mounted at the distal end 55 of the outer cylinder 11. As can be seen, the two elements 5a, 5b maintain their relative separation as they are adjusted. The system therefore allows the relative separation of two or more components 5a, 5b, etc. to be accurately set in an initial step and then allows those components to be moved together relative to other components or relative to the fixed structure 2. This arrangement is particularly useful in optical apparatus where for example a light source and lens may be accurately positioned relative to one another and then the combination can be adjusted relative to other components.

The method of adjustment (or assembly positioning) may be described as follows: First the gripping pin 6 of the movable rod 4 and the gripping pin 7 of the dovetail bar 3 are withdrawn (e.g. by means of set screw 8) to retracted states (disengaged, or low friction states). Next the first element 5a is slid along the dovetail bar 3 and the movable bar 4 to achieve an approximate or coarse position. The gripping pin 7 is then partially tightened (via set screw 8) to increase friction with the dovetail bar 3 sufficiently to remove any wobble of the assembly, while still allowing axial movement over the dovetail bar 3. The gripping pin 6 is then tightened firmly to clamp against the outer cylinder 11 of the movable bar 4. The rotational adjustment mechanism 16 (which may be referred to as a Z-axis adjustment screw, the Z-axis being the axis of the movable bar 4) is then rotated so as to provide a fine adjustment of the position of the first element 5a, i.e. providing a finer level of control than can be achieved by a coarse manual positioning.

Where other assemblies such as a second element 5b are also mounted on the fixed bar 3 and movable bar 4, relative positioning may proceed as follows: the first element 5a is firmly fixed to the dovetail bar 3 by firmly engaging the gripping pin 7 via set screw 8. The gripping pin 6 may then be released from the movable bar 4 so that further axial movement of the movable bar 4 does not affect the first element 5a. The second element 5b may then be coarsely adjusted along the fixed dovetail bar 3, then partially (and thus slidably) engaged with the dovetail bar 3 and firmly clamped to the outer cylinder 11 of movable bar 4. The second element 5b may then be finely positioned by rotation of the rotational adjustment mechanism 16 to axially move the movable bar 4 and second element 5b relative to the fixed bar 3 and first element 5a.

The two adjustable elements 5a, 5b may both then be fixed in place on the dovetail bar 3 by engaging the gripping pins 7 (and optionally releasing the gripping pins 6 if there is to be further movement of the movable bar 4). Alternatively, the two adjustable elements 5a, 5b may now be moved in unison without affecting their separation distance by fixing both firmly to the outer cylinder 11 of the movable bar 4 via the gripping pins 6 and then releasing both elements 5a, 5b from the fixed bar 3 by releasing the pressure on gripping pins 7 enough to allow axial movement (but preferably not sufficient to introduce play between the elements 5a, 5b and the fixed bar 3. Movement of the movable bar 4 (via rotational adjustment mechanism 16) will now cause simultaneous axial movement of both the first element 5a and second element 5b, while maintaining their axial separation.

It will be appreciated that other adjustable elements 5 may be added to the system and adjusted in the same way. The elements 5 that are adjustable via the movable bar 4 need not be adjacent, but could be either side of a fixed element 5 with the movable bar 4 free to move through the aperture 18 therein. It will also be appreciated that some elements 5 may not require precise axial positioning and can be provided only with means to fix to the fixed bar 3 with no gripping pin 6 for gripping to the movable bar 4. Such elements are simply positioned manually along the dovetail bar 3 and fixed in place. Examples of such elements include the support element(s) 2, structural elements for holding a cover in place, optical filters, etc. It will be appreciated that the width of each element 5a, 5b (i.e. the dimension parallel to the axis of the movable bar) where it mounts onto the dovetail bar 3 affects the quality of movement of the element; a larger width provides for smoother movement and more stable fixing on the dovetail bar 3 and allows for the largest gripping pin area (for better fixing).

Although the above description is with reference to a dovetail bar 3, it will be appreciated that other embodiments can use a different shaped fixed bar 3. The dovetail shape is useful for preventing accidental disengagement of adjustable elements 5, but is not essential to the functioning of the adjustment mechanism. Similarly, the shape of the outer surface 12 of the outer cylinder 11 is not restricted to a circular cross-section, but could for example be square in cross-section.

Figure 7:
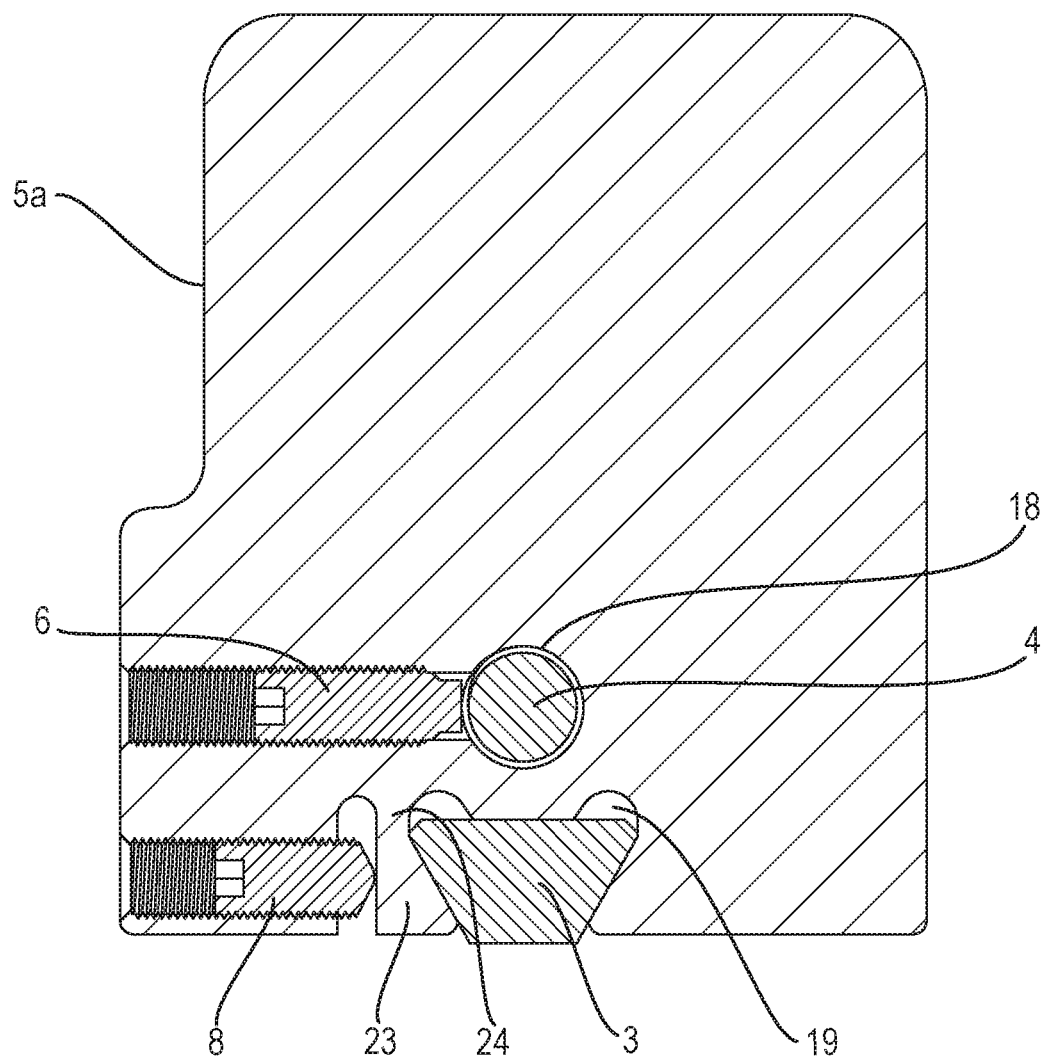
FIG. 7 shows an alternative frictional engagement mechanism.

FIG. 7 shows an alternative gripping mechanism for creating friction with the fixed bar 3. Instead of the gripping pin 7 engaging directly with the fixed bar 3, the gripping pin 7 is replaced by a gripping body 23 which is integrally formed with the main body of the adjustable element 5. The gripping body 23 is connected to the main body via a thin neck (or stalk) 24 which allows the gripping body 23 to be flexed relative to the main body. As the set screw 8 impinges upon the gripping body 23, the gripping body 23 is flexed towards and into frictional contact with the fixed bar 3. The degree of gripping can be adjusted by adjusting the degree of force provided by the set screw 8 as with the previously described embodiments.

Figure 8:
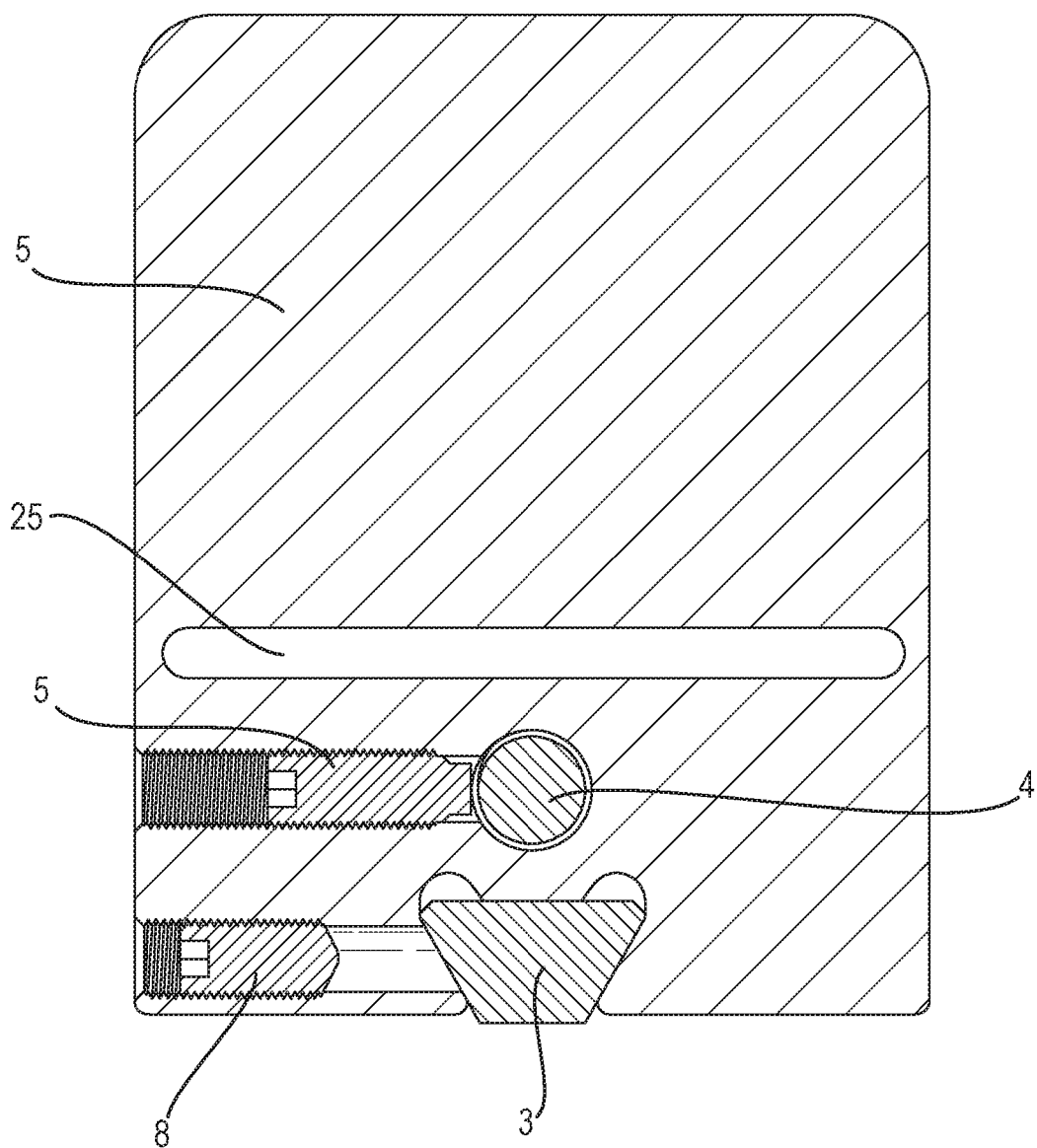
FIG. 8 shows an assembly with an air gap.

FIG. 8 shows a further modification in which the temperature of components attached to the element 5 is to be controlled. A slot 25 is formed horizontally across the element 5 to provide thermal isolation from the main support body. The slot 25 may be air filled (or other thermally insulating gas) or a thermally insulating material may be placed in the slot 25.

Figure 9:
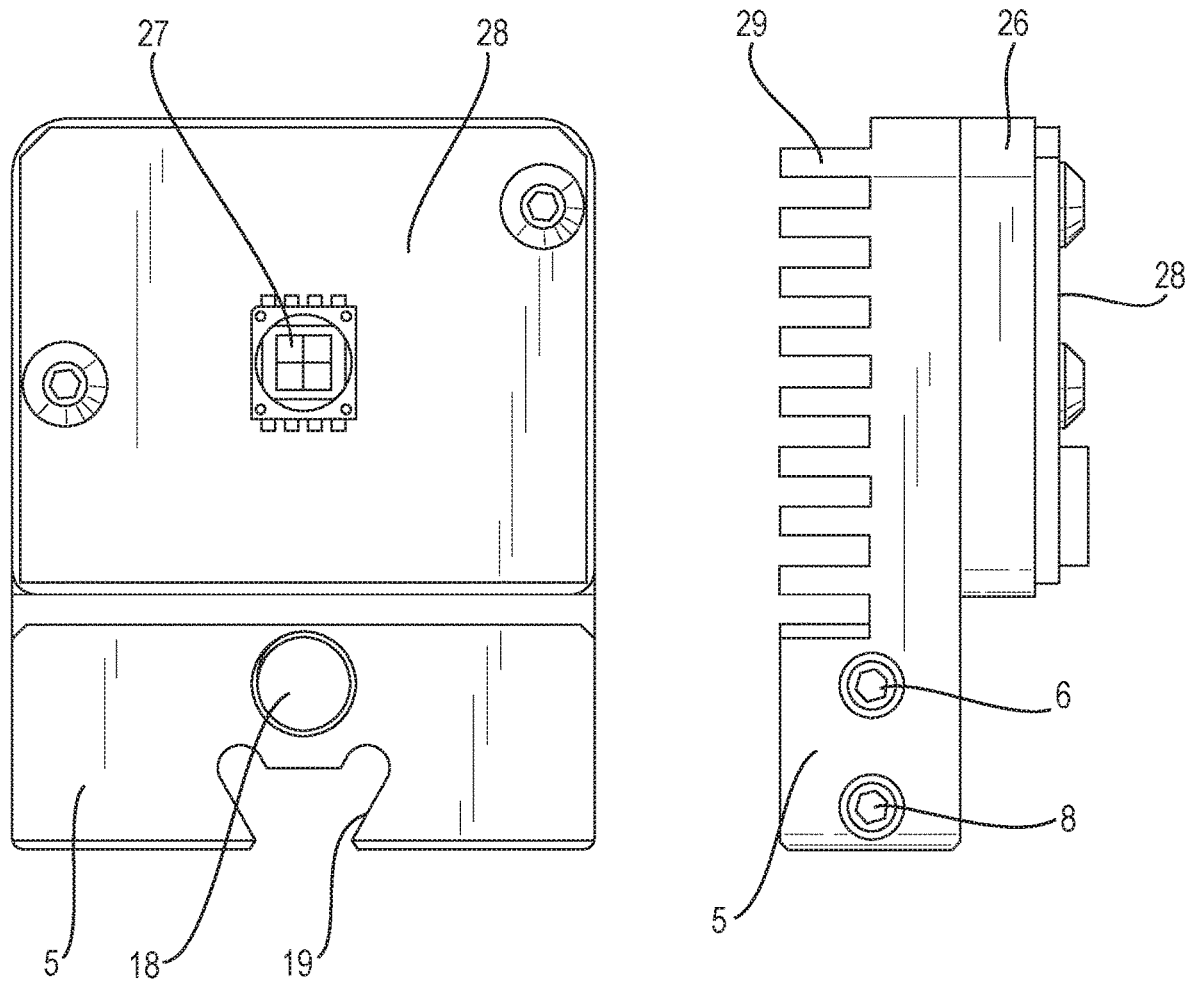
FIG. 9 shows an element with a light source mounted thereto.

FIG. 9 illustrates a light source 27 (in this case a set of four LEDs in 2×2 square formation) mounted on a printed circuit board 28 that is in turn mounted on a heat conductor 26 attached to the adjustable element 5. The adjustable element 5 has a heat sink 29 formed on a rear surface so that heat form the light source 27 can be dissipated quickly and efficiently. A fan may also be provided, preferably on a separate adjustable element 5.

Other optional features of the apparatus 1 include the following: The adjustable bar 4 may have a taper provided on its distal end 55 to ease mounting of adjustable elements 5 thereon. The cut-outs on each element for receiving the dovetail bar 3 may be formed with overcuts 19 which are rounded and easily machined by drilling which is easier than forming a sharp acute angle to match the dovetail shape closely. The acute angled corners of the dovetail bar 3 itself may be chamfered for ease of machining and ease of mounting of elements 5 thereon. The elements 5 may be sized so that when mounted on the dovetail bar 3, the lower edge of the element 5 is not as low as the lower edge of the dovetail bar 3 (i.e. the dovetail cut-out on the element 5 is not as high as the dovetail bar 3) such that a gap is provided underneath the element 5 (and between the element 5 and an underlying base unit). This gap allows for passage of flat (e.g. ribbon) cables or small electrical wires along the length of the bar 3 so as to supply power and/or signals to components mounted on the elements 5.

The above description is all in relation to a single dimension (Z) of adjustment. In some cases, further adjustment in the remaining two orthogonal dimensions may also be required (or at least beneficial). The following two-dimensional (X-Y) adjustment mechanism provides such adjustment. It will be appreciated that the two-dimensional (X-Y) adjustment may be used in its own right, without the linear (Z-axis) adjustment described above. Where the two adjustment mechanisms are to be combined, one convenient way to achieve this is to provide the X-Y adjustment mechanism on an adjustable element 5 of the linear adjustment mechanism described above, mounted to the fixed bar 3, and optionally also to the movable bar 4.

FIG. 10*a* shows an embodiment of an X-Y (two-dimensional) adjustment mechanism 70. The key movable element of this mechanism 70 is the movable plate 41. Any element to be adjusted (such as a light source—see for example FIG. 9) can be mounted to the movable plate 41 so that it moves therewith.

The movable plate 41 is adjustable in the two dimensions X and Y that are indicated in the lower right corner of FIG. 10*a*. The X and Y positions are defined by first position actuator 42 (X-axis actuator) and second position actuator 43 (Y-axis actuator) which are both in contact with the movable plate 41. Each actuator 42, 43 is formed as a threaded pin engaged in a threaded bore of the device body 40 (which may for example be the main body of an adjustment element 5 described above). It will be appreciated that threaded pins and bores are not essential and that other positional controls could be used such as pneumatic, hydraulic or electronic actuators. The actuators 42, 43 preferably have low friction tips 51, e.g. nylon tips so as to minimise friction when sliding against movable plate 41. Also in contact with the movable plate 41 is a spring loaded member 44 which is mounted on a sliding shaft 45 and is biased against the movable plate 41 by means of springs 46. The spring loaded member 44 serves to keep the movable plate 41 in firm contact with both of the first and second positioning actuators 42, 43. The spring loaded member 44 thus serves to minimise backlash in the first and second positioning actuators 42, 43. To minimise friction, nylon tipped screws may be used for the actuators 42, 43 and anodised aluminium may be used for the moveable plate 41 and the spring loaded member 44 (preferably with a lubricant to facilitate sliding).

The movable plate 41 is triangular shaped with its three edges forming three flat surfaces. A first flat surface 48 faces the first positioning actuator 42. A second flat surface 49 faces the second positioning actuator 43 and a third flat surface 50 faces the spring loaded member 44. The first flat surface 48 is perpendicular to the second flat surface 49 so that the movable plate 41 forms a right-angled triangle with the third flat face 50 forming the hypotenuse, and thus not being perpendicular to either of the first or second flat surfaces 48, 49.

The orthogonal sides 48, 49 of the moveable part 41 are pushed against the positioning actuators 42, 43 by the spring loaded member 44 which pushes against the third side 50 of the moveable part 41. In the embodiment shown in FIG. 10*a* the third flat surface 50 is at 45 degrees to each of the other flat surfaces 48, 49 as this is provides an equally balanced biasing force against the two positioning actuators 42, 43.

Importantly, the spring loaded member 44 has a flat surface 52 which is in sliding contact with the third flat surface 50 of the movable plate 41. This surface to surface contact (as opposed to the substantially point contacts made by the positioning actuators 42, 43) ensures stability of the movable plate 41, preventing rotation thereof. The third flat surface 50 of the movable plate 41 is retained parallel to the flat surface 52 of the spring loaded member 44 under the forces from the positioning actuators 42, 43 and the springs 46. The angle of the flat surface 52 is fixed by the mounting of the shaft 45 within a groove 53 formed in the device body 40. A good (snug) fit of the shaft 45 in the groove 53 is important to reduce play and to keep the orientation of the movable plate 41 steady. The shaft 45 and groove 53 constrain the movement of the spring loaded member 44 and define the axis of its movement. The quality of the fit of the shaft 45 in the groove 53 impacts the quality of the movement.

The X-Y adjustment mechanism 70 is used as follows: The positioning actuators 42, 43 or advanced or retracted. Under the influence of the positioning actuators 42, 43 the moveable plate 41 is forced to move along the axis of the actuator 42, 43. It is restricted against movement in the orthogonal axis by the position of the other actuator 42, 43 and it is restricted from rotation by the spring loaded member 44 and the interface between the third flat surface 50 of the movable plate 41 and the flat surface 52 of the spring laded member 44. As the first positioning actuator 42 is adjusted, the second flat face 49 slides with respect to the second positioning actuator 43 and the flat surface 50 of the movable plate 41 slides with respect to the flat surface 52 of the spring loaded member 44 while the shaft 45 slides within the groove 53. Similarly, as the second positioning actuator 43 is adjusted, the first flat face 48 slides with respect to the first positioning actuator 42 and the flat surface 50 of the movable plate 41 slides with respect to the flat surface 52 of the spring loaded member 44 while the shaft 45 slides within the groove 53.

Although not illustrated in FIG. 10*a*, the movable plate 41 is restricted from movement in the Z-direction by being mounted between the device body 40 and a cover plate (not shown). The movable plate 41 is located in a recess 54 of the device body 40 with the cover plate mounted to cover the recess 54, enclosing the movable plate 41 therein. However, in order not to create too much friction by this sandwiching arrangement, it is preferably not to mount the movable plate 41 too tightly. One option is to machine the pieces to very high tolerances so that there is very little play, but also little friction. However this is expensive. An alternative and more cost effective solution is to make the recess 54 deeper than the movable plate 41. To ensure consistent Z-axis positioning, the cover plate is formed from a ferrous material and one or more magnets 47 (three shown in FIG. 10*a*) are provided on the movable plate 41. The attraction between the magnets 47 and the ferrous cover plate ensures that the movable plate 41 remains in contact with the cover plate and thus consistently positioned in the Z-axis. The strength of the magnets 47 is selected so as to ensure sufficiently reliable contact without excessive friction. The magnets 47 will permit sliding between the movable plate 41 and the cover plate as the X and Y adjustments are made.

FIG. 10*b* shows a variation of the arrangement of FIG. 10*a*. The arrangements are identical except that instead of the movable plate 41 being held against the cover plate by magnets, the engagement surfaces of the biasing member 44 and the movable plate 41 (i.e. angled face 56 and third flat surface 50) are angled away from being perpendicular to the main faces of the movable plate 41. This is illustrated in FIG. 10*c* which is a cross-section taken along the line C-C in FIG. 10*b*. The angled surfaces generate a component of the force from the biasing member 44 that presses the movable plate 41 against the device body 40, thereby keeping it held against the device body 40. To assist with this, a groove 56 is provided in the edge of the movable plate 41 adjacent to each of the X and Y position actuators 42, 43. The tips 51 of each position actuator 42, 43 run in the grooves 55 and help to keep the movable plate 41 held tightly against the device body 40.

FIG. 11 shows a variation of the arrangement of FIG. 10*a*. The arrangements are identical but for the shape of the movable plate 41, the shape of the recess 54 and the absence of magnets from this embodiment. This variation illustrates that the shape of the movable plate 41 does not need to be triangular, but the three edges of the triangle can be shortened. The first and second flat surfaces 48 and 49 are still orthogonal and the third flat surface 50 is still at an angle to both. If these faces were all extended in straight lines they would form a triangle as before. However, the first and second flat surfaces 48, 49 only need to extend far enough to allow for the adjustment ranges. The third flat surface 50 only needs to provide sufficient contact area with the spring loaded member 44 to prevent rotation of the movable plate 41.

The moveable plate 41 may be connected to an element that is intended to be moved, e.g. by having an extension that passes through either the device body or the cover plate. Alternatively the moveable plate 41 may have the component that is intended to be adjusted mounted directly thereon (i.e. between the device body 40 and cover plate). In this case cut-outs in the device body 40 and/or the cover plate may be required to allow line-of-sight to the component. Particularly in the case of optical components such as light sources, light receivers and lenses this is important to allow light transmission and/or reception.

Graticules may be marked on to the device body 40 and the moveable plate 41 to allow the measurement of the device's position. A simple linear scale and marker may be used or a vernier scale may be used for more precise measurement.

Variations of the embodiments described in FIGS. 10*a*-*c* and 11 include the following: The force applied by springs 46 could come from other means such as fluid pressure or other mechanical means. A single spring 46 could be provided instead of the two shown in FIGS. 10*a*-*c* and 11 (although two, with one either side of the shaft 45 provides good balance). The positioning actuators 42, 43 may be rotary cams, pneumatic devices, linear motors, piezoelectric devices, etc. Lock nuts may be provided to secure the actuators in a particular position once set. The positioning actuators 42, 43 and the spring loaded member 44 may contact the moveable part with a rotating bearing instead of a simple low friction interface. Instead of magnets 47, springs or fluid pressure or gravity may be used to control the Z-axis movement of the movable plate 41. The magnets 47 could attract to the device body 40 rather than the cover plate or they could be arranged to repel either the device body 40 or the cover plate.

The Z-axis adjustment mechanism and/or the X-Y adjustment mechanism, preferably both together can be used for a variety of situations where accurate adjustment is required with fine control. The mechanisms find particular benefit in optical apparatus where the relative positioning of the various components needs to be controlled accurately. The mechanisms are useful both for industrial devices and for educational purposes, e.g. to allow easy experimentation.

FIG. 12 schematically illustrates some components of a light source module 100. The module 100 has a number of thermally linked components indicated at 101 and a thermally separated component being the non-volatile memory 102 (although this may also be thermally linked in some embodiments). All of these components 101, 102 are connected to interface 103 which can connect to a controller (not shown in FIG. 12). The thermally linked components include a heat sink 104, a light source 105 (here it is one or more LEDs), a temperature sensor 106, an optional heater 107 and an optional cooler 108 (in the form of a peltier or other thermoelectric cooler).

The memory 102 stores attributes of the light source 105 (described further below). The interface 103 is arranged to communicate with a controller. In particular, it can receive a request for information from the memory 102 and it can output requested information retrieved from the memory 102. The interface 103 can also receive control signals to operate the light source 105, e.g. controlling the current applied to the light source 105.

As the memory 102 is provided as part of the light module 100, it travels with the light source 105 and is always available to provide the correct attributes for the light source 105. This affords the controller much greater flexibility as it can use many different light modules 100 without needing to be reprogrammed with the correct attributes for that light source. Instead, it can rely on retrieving those attributes from the on-board memory 102.

Having an on-board memory 102 storing the key parameters and characteristics of the light source 105 thus allows the module 100 to be used in an interchangeable fashion by a generic controller. An off-module controller can be connected to the module via the interface 103 and can then interrogate the memory 102 to obtain the necessary parameters that it needs to control the light source 105. The module 100 need not be shipped with a built in controller and indeed preferably has no light source controller thereon. The user has a high degree of control over the selected module 100 as well as being able to swap the module 100 easily for a different module 100.

It will be appreciated that the memory 102 may be a single memory module or it may be two (or more) separate memory modules (although these may essentially be considered as a single memory). Within the memory (whether it be one or more modules), there may be separate memory sections for different pieces of information, although it will be appreciated that there are many ways to arrange a memory and that the arrangement described here is not important or essential.

In a first memory section, the information stored includes:
1. For the overall LED module 100:
   Number of Devices
   Types of Devices (LED, laser etc)
   Thermal control method (Heater, Heater and Peltier, Peltier)
   Target operating temperature
   Maximum device temperature
   Minimum device temperature
2. For each device 105:
   Device status (on/off)
   Maximum operating current
   Maximum Voltage drop
   (At maximum current and minimum temperature)

The first memory section stores some of the most important characteristics that determine the appropriate control of the light source 105 and enable the controller to perform its function.

In a second memory section, the information stored includes:
1. Error detection/correction
2. For overall LED module 100:
   Date of manufacture
   Shelf life Thermal Controller parameters (e.g. PID values or thermal response time)

3. For each device 105:

Desired operating current

Typical operating characteristics (for each device)
  Typical current
  Typical target temperature
  Power at typical operating current and temperature
  Wavelength at typical operating current and temperature Operating Mode—e.g. internal/external, digital/analogue modulation Maximum usage time Usage information—continuously updated device while is active such as
  time;
  time with drive current;
  time with temperature;
  time with current and temperature;

Power derating function with usage information

Wavelength as a function of temperature/current

Optical power as a function of temperature and current dissipated power as a function of temperature and current Laser Threshold current (in case the device 105 is a laser)

The spectrum of the source as a function of drive current and temperature

Power variation as a function of temperature

The memory 102 is a writable memory (such as an EEPROM) so that the controller can store information on the current and historic usage of the light source 105. This usage information may be collected to keep track of time-varying characteristics of the light source 105, e.g. characteristics which change with accumulated usage such as degradation that may occur with excessive high temperature operation or simply changes due to material changes that occur over time. The memory 102 may comprise tables of usage in different temperature bands or current bands (e.g. time in operation within each band). The current operating parameters may also be stored and can then be used upon the next start up as the last known (and therefore initial) operating state.

The temperature of the light source 105 can affect its operating characteristics and therefore is important for accurate control. Temperature can vary greatly depending on operating conditions. The temperature sensor 106 is preferably mounted in close proximity, e.g. adjacent to the light source 105. At the minimum it is part of the thermally linked group of components 101. The interface 103 outputs temperature information from the temperature sensor 106.

The light source module 100 optionally includes a heater 107 and cooler 108. The interface 103 can receive a temperature control signal which is used to control operation of the heater 1067 and cooler 108 when present. The controller can then use the detected temperature from the temperature sensor 106 and responsively control the temperature by activating and deactivating the heater 107 and/or cooler 108.

The module 100 also has a heat sink 104 as a passive heat dissipation device.

FIG. 13 illustrates how a controller 200 which is separate from the module 100 interfaces with the interface 103 of module 100.

User control such as digital and analogue modulation may be provided as indicated at 201. This is shown as a direct input to a drive circuit 202. A heater drive circuit 203, a cooler (peltier) drive circuit 204 and a fan drive circuit 205 (for fan 207) are also provided (if required). These are all controlled by a processor 206.

The processor 206 is also connected to the interface 103 to obtain information from the temperature sensor 106 as indicated at 208 and is connected to the interface 103 to obtain information from the memory 102 as indicated at 209. Finally, the processor 206 is also provided with other user connections such as USB and Bluetooth at 210 and can control warning indicators 211 to alert a user to any anomalous situations.

The invention claimed is:

1. An adjustable mount comprising:
   a support;
   a fixed bar mounted to the support;
   an axially movable bar extending from the support and being axially movable relative thereto; and
   a first element movably mounted to the fixed bar and movably mounted to the movable bar;
   wherein the first element is selectively fixable relative to the fixed bar and is selectively fixable relative to the movable bar;
   wherein the first element comprises a first gripping device for gripping the movable bar; and wherein the first element comprises a second gripping device for gripping the fixed bar;
   wherein the second gripping device is adjustable in the degree of gripping it applies to the fixed bar; and
   wherein the second gripping device comprises a gripping body with a friction surface flexibly attached to the first element and an actuator arranged to bias the friction surface against the fixed bar.

2. An adjustable mount as claimed in claim 1, wherein the first element comprises a light source module comprising:
   a light source;
   a memory storing attributes of the light source;
   an interface arranged to:
     receive a request for information from the memory;
     output requested information from the memory; and
     receive control signals to operate the light source.

3. An adjustable mount as claimed in claim 2, further comprising a temperature sensor arranged to sense the temperature of the light source.

4. An adjustable mount as claimed in claim 3, wherein the interface is further arranged to output temperature information from the temperature sensor.

5. An adjustable mount as claimed in claim 2, wherein the memory stores at least one of:
   target operating temperature of the light source;
   maximum operating temperature of the light source;
   minimum operating temperature of the light source;
   maximum operating current;
   maximum voltage drop.

6. An adjustable mount as claimed in claim 2, further comprising a heater and wherein the interface is arranged to receive a temperature control signal which is used to control operation of the heater; and/or
   further comprising an active cooling device and wherein the interface is arranged to receive a temperature control signal which is used to control operation of the active cooling device.

7. An adjustable mount as claimed in claim 1, wherein the movable bar comprises an inner shaft with an outer cylinder movably mounted thereon.

8. An adjustable mount as claimed in claim 7, wherein the outer cylinder has a smooth outer surface for engagement with the first gripping device of the first element,
   wherein the outer cylinder is internally threaded and the inner shaft is externally threaded such that relative rotation of the inner shaft and the outer cylinder causes relative axial movement of the outer cylinder; and wherein the inner shaft is rotatably mounted to the support and is rotatable via a rotary adjustment mechanism.

9. An adjustable mount as claimed in claim 1, wherein the movable bar is mounted to the support in cantilever fashion and is tapered towards its distal end.

10. An adjustable mount as claimed in claim 1, further comprising:

a second element movably mounted to the fixed bar and movably mounted to the movable bar;

wherein the second element is selectively fixable relative to the fixed bar and is selectively fixable relative to the movable bar.

11. An adjustable mount comprising:

a support;

a fixed bar mounted to the support;

an axially movable bar extending from the support and being axially movable relative thereto; and a first element movably mounted to the fixed bar and movably mounted to the movable bar;

wherein the first element is selectively fixable relative to the fixed bar and is selectively fixable relative to the movable bar, wherein the first element comprises a first gripping device for gripping the movable bar;

wherein the movable bar comprises an inner shaft with an outer cylinder movably mounted thereon;

wherein the outer cylinder has a smooth outer surface for engagement with the first gripping device of the first element, wherein the outer cylinder is internally threaded and the inner shaft is externally threaded such that relative rotation of the inner shaft and the outer cylinder causes relative axial movement of the outer cylinder; and wherein the inner shaft is rotatably mounted to the support and is rotatable via a rotary adjustment mechanism.

12. An adjustable mount as claimed in claim 11, wherein the first element comprises a light source module comprising:

a light source;

a memory storing attributes of the light source;

an interface arranged to:

receive a request for information from the memory;

output requested information from the memory; and receive control signals to operate the light source.

13. An adjustable mount as claimed in claim 12, further comprising a temperature sensor arranged to sense the temperature of the light source.

14. An adjustable mount as claimed in claim 13, wherein the interface is further arranged to output temperature information from the temperature sensor.

15. An adjustable mount as claimed in claim 12, wherein the memory stores at least one of:

target operating temperature of the light source;

maximum operating temperature of the light source;

minimum operating temperature of the light source;

maximum operating current;

maximum voltage drop.

16. An adjustable mount as claimed in claim 12, further comprising a heater and wherein the interface is arranged to receive a temperature control signal which is used to control operation of the heater; and/or further comprising an active cooling device and wherein the interface is arranged to receive a temperature control signal which is used to control operation of the active cooling device.

17. An adjustable mount comprising:

a support;

a fixed bar mounted to the support;

an axially movable bar extending from the support and being axially movable relative thereto; and a first element movably mounted to the fixed bar and movably mounted to the movable bar;

a second element movably mounted to the fixed bar and movably mounted to the movable bar;

wherein the first element is selectively fixable relative to the fixed bar and is selectively fixable relative to the movable bar; and wherein the second element is selectively fixable relative to the fixed bar and is selectively fixable relative to the movable bar.

18. An adjustable mount as claimed in claim 17, wherein the first element comprises a light source module comprising:

a light source;

a memory storing attributes of the light source;

an interface arranged to:

receive a request for information from the memory;

output requested information from the memory; and receive control signals to operate the light source.

19. An adjustable mount as claimed in claim 18, wherein the memory stores at least one of:

target operating temperature of the light source;

maximum operating temperature of the light source;

minimum operating temperature of the light source;

maximum operating current;

maximum voltage drop.

20. An adjustable mount as claimed in claim 17, further comprising a temperature sensor arranged to sense the temperature of the light source.

21. An adjustable mount as claimed in claim 20, wherein the interface is further arranged to output temperature information from the temperature sensor.

22. An adjustable mount as claimed in claim 17, further comprising a heater and wherein the interface is arranged to receive a temperature control signal which is used to control operation of the heater; and/or further comprising an active cooling device and wherein the interface is arranged to receive a temperature control signal which is used to control operation of the active cooling device.

* * * * *